(12) United States Patent
Putilin et al.

(10) Patent No.: US 7,224,526 B2
(45) Date of Patent: May 29, 2007

(54) THREE-DIMENSIONAL FREE SPACE IMAGE PROJECTION EMPLOYING FRESNEL LENSES

(75) Inventors: Andrey N. Putilin, Moscow (RU); Andrew Lukyanitsa, Moscow (RU)

(73) Assignee: NeurOK LLC, McLean, VA (US)

( * ) Notice: Subject to any disclaimer, the term of this patent is extended or adjusted under 35 U.S.C. 154(b) by 296 days.

(21) Appl. No.: 10/820,158

(22) Filed: Apr. 8, 2004

(65) Prior Publication Data

US 2004/0227992 A1 Nov. 18, 2004

Related U.S. Application Data

(63) Continuation-in-part of application No. 10/751,654, filed on Jan. 6, 2004, now Pat. No. 6,985,290, which is a continuation-in-part of application No. 09/977,462, filed on Oct. 15, 2001, now Pat. No. 6,717,728, which is a continuation-in-part of application No. 09/456,826, filed on Dec. 8, 1999, now abandoned.

(51) Int. Cl.
*G02B 27/22* (2006.01)
*G03B 21/26* (2006.01)
*G09G 5/00* (2006.01)

(52) U.S. Cl. ................. 359/462; 359/449; 359/460; 353/7; 353/30; 345/6

(58) Field of Classification Search ............ 359/462, 359/443, 449, 460; 353/7, 30; 345/6
See application file for complete search history.

(56) References Cited

U.S. PATENT DOCUMENTS

| 5,264,964 | A | * | 11/1993 | Faris | 359/465 |
| 5,945,965 | A | * | 8/1999 | Inoguchi et al. | 345/6 |
| 5,993,004 | A | * | 11/1999 | Moseley et al. | 353/8 |
| 6,252,707 | B1 | * | 6/2001 | Kleinberger et al. | 359/465 |
| 6,533,420 | B1 | * | 3/2003 | Eichenlaub | 353/7 |
| 6,714,174 | B2 | * | 3/2004 | Suyama et al. | 345/32 |

* cited by examiner

*Primary Examiner*—W. B. Perkey
*Assistant Examiner*—Magda Cruz
(74) *Attorney, Agent, or Firm*—Hogan & Hartson LLP

(57) ABSTRACT

Disclosed herein are three-dimensional free space imaging systems and related methods employing a dynamic stereoscopic image projection system in combination with a optic module comprising a doublet of Fresnel lenses. The dynamic projector systems calculating derived flat image information for each projector based upon inputted stereopair images and information regarding the projector elements and optic module. In preferred embodiments of the present invention, the projection system uses an image computational device that employs a neural network feedback calculation to calculate the appropriate flat image information and appropriate images to be projected on the screen by the projectors at any given time.

23 Claims, 14 Drawing Sheets

THREE-DIMENSIONAL FREE SPACE IMAGE PROJECTION EMPLOYING FRESNEL LENSES

REFERENCE TO RELATED APPLICATIONS

This application is a continuation in part of U.S. non-provisional patent application Ser. No. 10/751,654, filed Jan. 6, 2004 and with the title "VISUALIZATION OF THREE DIMENSIONAL IMAGES AND MULTI ASPECT IMAGING" now U.S. Pat. No. 6.985,290, which application in turn is a continuation in part of U.S. non-provisional patent application Ser. No. 09/977,462, filed Oct. 15, 2001, now U.S. Pat. No. 6,717,728, which in turn is a Continuation-in-Part of U.S. patent application Ser. No. 09/456,826, filed Dec. 8, 1999 now abandoned.

FIELD OF THE INVENTION

The present invention relates to the projection of three-dimensional images into free space. More particularly, the present invention relates to apparatuses and related methods for three-dimensional image projection utilizing stereo aspect images projected through a Fresnel lens containing optic module.

BACKGROUND OF THE INVENTION

Projective displays use images focused onto or through a diffuser, screen, lens, or other optic module to present an image to a user. The projection may be done from the same side of the optic module as the user (i.e., reflecting the image off the optic module), as in the case of cinema projectors and a cinema screen, or from the opposite side, such as is used in current rear projection television technology. Prior art projection systems typically produce a two-dimensional image by using a single projector to project a single image at a time onto a screen. The screen would have a linear light distribution such that all viewers of the image reflected by screen would see the same two-dimensional image regardless of the positions at which they are located.

In contemporary projection systems, the image can be generated on one or more "displays," such as a miniature liquid crystal display device that reflects or transmits light in a controllable pattern formed by its constituent switchable pixels. Such liquid crystal displays are generally fabricated with microelectronics processing techniques such that each grid region, or "pixel," in the display is a region whose reflective or transmissive properties can be controlled by an electrical signal. In a liquid crystal display, the light incident on a particular pixel is either reflected, partially reflected, or transmitted by the pixel, depending on the signal applied to that pixel. In some cases, liquid crystal displays are transmissive devices where the transmission through any pixel can be varied in steps (gray levels) over a range extending from a state where light is substantially blocked to the state in which incident light is substantially transmitted. Such transmissive liquid crystal displays can be used as controllable optic modules as is known in the art.

When a uniform beam of light is reflected from (or transmitted through) a liquid crystal display, the beam gains a spatial intensity profile that depends on the particular transmission state of the various pixels in the display. Thus, an image can be formed at the liquid crystal display by electronically adjusting the transmission (or gray level) of each of the pixels to correspond to a desired image. This image can be projected (such as by backlighting a transmissive liquid crystal display) onto a diffusing screen for direct viewing, or, alternatively, it can be imaged through a lens or some other optic module by which it can be magnified by an eyepiece or otherwise viewed to give a virtual image.

The three-dimensional display of images, which has long been the goal of electronic imaging systems, has many potential applications in modern society. For example, training of professionals, from pilots to physicians, now frequently relies upon the visualization of three-dimensional images. Understandably, three-dimensional imaging also has numerous potential applications in entertainment. In many applications of three-dimensional imaging it is important that multiple perspectives of an image be able to be viewed so that, for example, during simulations of examination of human or mechanical parts, a viewer can have re-created a continuous three-dimensional view of those parts from multiple angles and viewpoints in a manner closely emulating real life three-dimensional vision.

Thus, real-time, three-dimensional image displays have long been of interest in a variety of technical applications. Heretofore, several techniques have been known in the prior art to be used to produce three-dimensional and/or volumetric images. These techniques vary in terms of complexity and quality of results, and include computer graphics which simulate three-dimensional images on a two-dimensional display by appealing only to psychological depth cues; stereoscopic displays which are designed to make the viewer mentally fuse two retinal images (one each for the left and right eyes) into one image giving the perception of depth; holographic images which reconstruct the actual wavefront structure reflected from an object; and volumetric displays which create three-dimensional images having real physical height, depth, and width by activating actual light sources of various depths within the volume of the display.

Auto-stereoscopic displays in particular have been widely researched in attempts to create real-time full-color three-dimensional displays. The principle of stereoscopy is based upon the simultaneous imaging of two different viewpoints, corresponding to the left and right eyes of a viewer, to produce a perception of depth from paired two-dimensional images. In stereoscopic imaging, an image is recorded using conventional photography (or video recording) of the object from different vantages that correspond, for example, to the distance between the eyes of the viewer.

Ordinarily, for the viewer to receive a spatial impression from viewing stereoscopic images of an object projected onto a screen, it has to be ensured that the left eye sees only the left image and the right eye only the right image. While this can be achieved with headgear or eyeglasses, auto-stereoscopic techniques have been developed in an attempt to abolish this limitation. Conventionally, however, auto-stereoscopy systems have typically required that the viewer's eyes be located at a particular position and distance from a view screen (commonly known as a "viewing zone") to produce the stereoscopic effect.

One way of increasing the effective viewing zone for an auto-stereoscopic display is to create multiple simultaneous viewing zones. This approach, however, imposes increasingly large bandwidth requirements on image processing equipment. Furthermore, much research has been focused on eliminating the restriction of viewing zones by tracking the eye/viewer positions in relation to the screen and electronically adjusting the emission characteristic of the imaging apparatus to maintain a stereo image. Thus, using fast, modern computers and motion sensors that continuously register the viewer's body and head movements as well as a corresponding image adaptation in the computer, a spatial impression of the environment and the objects (virtual reality) can be generated using stereoscopic projection. As the images become more complex, this prior art embodying this approach has proven less and less successful.

The nature of stereoscopic vision allows parallax to be observed only from discrete positions in limited viewing zones in prior art auto-stereoscopy systems. For example, any stereoscopic pair in standard auto-stereoscopy systems gives the correct perspective when viewed from one position only. Thus, auto-stereoscopic display systems must be able to sense the position of the observer and regenerate the stereo-paired images with different perspectives as the observer moves. This is a difficult task that has not been mastered in the prior art.

Further, there is also present interest in various industries for relatively inexpensive systems that can generate relatively high quality "free space" images in free space whereby the image appears to float in air in front of the viewer without requiring the user to wear specialized eyewear or any such implements. U.S. Pat. No. 6,055,100, issued to Kirk et al., discloses one particular free space imaging system. This particular system utilizes a doublet form of optic module, where the doublet is formed from two large Fresnel lenses configured such that their echelon groove components are mutually oppositely disposed within the optical transmission path of the system. The projection of an image through the lens doublet to a focal point on the other side of the doublet causes a predictable curving to the output focal plane for the projected image.

While the use of lens doublet as disclosed by Kirk emulates a sense of three-dimensionality to a viewer within a relatively wide field of view, this system still is not ideal for three-dimensional free-space imaging. The system disclosed by Kirk attempts to create a three-dimensional viewing effect using a projected two-dimensional image and chromic aberrations. This approach leads to an imperfect image effect.

In light of the current state of the art of image projection, it would be desirable to have a system that is capable of projecting numerous aspects or "multi-aspect" images such that the user can see many aspects and views of a particular object when desired. It would further be useful for such viewing to take place in a flexible way so that the viewer is not constrained in terms of the location of the viewer's head when seeing the stereo image. Additionally, it would be desirable for such a system to be able to provide superior three-dimensional image quality while being operable without the need for special headgear. Thus, there remains a need in the art for improved methods and apparatuses that enable the projection of high-quality three-dimensional "free space" images to viewing locations.

SUMMARY OF THE INVENTION

In view of the foregoing and other unmet needs, it is an object of the present invention to provide a three-dimensional free-space image projection system that enables high-quality three-dimensional imaging to one or more flexible image output locations.

Similarly, it is an object of the present invention to provide apparatuses and associated methods for adaptive three-dimensional free-space imaging that provides high-resolution images without having to limit the viewer to a restrictive viewing zone.

Also, it is an object of the present invention to provide apparatuses and associated methods for multi-aspect three-dimensional free-space imaging that can simultaneously emulate perceptions of object parallax and spatial parallax.

Additionally, it is an object of the present invention that such apparatuses and the associated methods do not require the viewer to be constrained by specialized viewing equipment, such as headgear or eyeglasses.

Further, it is an object of the present invention to provide three-dimensional free-space imaging systems and methods that can display various images and perspectives of an object using image pairs which have been calculated to produce a perceived three-dimensional image when simultaneously projected for viewing.

To achieve these and other objects, three-dimensional free space image projection systems and related methods according to the invention generate perceived three-dimensional images in free space through the utilization of lens-type optic modules placed in the projection path of a dynamic stereoscopic image projection system. The optic modules according to embodiments of the present invention are fashioned from Fresnel lenses configured as a doublet to perform in a predictable manner as a single optical component. The dynamic stereoscopic image projection system includes one or more luminous transmission displays, such as one or more liquid crystal display projectors or the like, that project images through the optic modules to form three-dimensional images in the free space on the opposite side of the optic module. The Fresnel lenses of the optic module achieve substantial imaging improvement in terms of image contrast or signal-to-noise ratio and field of view and assist in providing an improved three-dimensional effect as described hereafter.

According to embodiments of the present invention, the Fresnel lenses that comprise the optic module are oriented in a paired manner to achieve object parallax in the projected stereoscopic images. Object parallax is produced by optic modules as the module distorts the shape of the output focal plane for the projected images. The resulting output focal plane is warped or curved by the module providing an emulation of object parallax produced by the curved focal plane. When a flat, two-dimensional image produced by the dynamic image projection system is projected through the optic module onto a curved focal plane, a form of object parallax is emulated wherein the observer observes portions of the originally flat image as existing at either side of the curved focal plane.

The optic modules according to the present invention have the two Fresnel lenses arranged relative to one another such that their echelon grooves face in opposite directions along the optical path (i.e., one lens facing toward the dynamic image projection system and the other toward the focal planes). Depending upon the relief type of the lenses employed, the echelon grooves face either mutually inwardly toward each other or mutually outwardly away from each other.

The dynamic stereoscopic image projection system employed in embodiments of the invention provides the ability to generate at least two projected stereoscopic images through parallel information processing of stereo and multi aspect images. The images can be processed for a single continuous three-dimensional ("3-D") imaging zone or multiple 3-D imaging zones for multiple users and/or images. Preferably, the processing according to embodiments of the present invention is adaptive in nature so as to be continually re-processed as the location(s) of a given viewer or viewers changes or as the image is directed or desired to be changed by the viewer, a governing control program, or some other type of operator. The ability to create dynamic free-space image of significant quality allows the perception of 3-D images by any given viewer without constraining the viewer in any meaningful way.

In a first embodiment of the dynamic stereoscopic image projection system as employed in embodiments of the present invention, there are at least two transmissive electronic display screens positioned one behind another relative to the imaging path, with the transmissive electronic display screens also being positioned on the opposite side of the optic module from the image output focal planes. As is known in the art, each such display screen is composed of multiple pixels or cells that collectively are capable of forming a pixilated image. Although such transmissive electronic display screens will be referred to hereinafter generically as liquid crystal displays (abbreviated as "LCDs," or "LCD" in the singular), embodiments of the present invention are not limited to LCDs, but can use other transmissive electronic display means, such as, but not limited to, plasma displays, and OLED (organic light emitting diodes) or OLEP (organic light emitting polymer) screens. The screens employed in the first embodiment of the dynamic image projection system are transmissive, i.e., they each transmit light. Thus, a controllable illumination source is positioned behind the screens to illuminate and project any image created on each LCD's screen toward and through the optic module.

Optionally, a separate mask panel can be included between the LCD panels so as to increase the image quality and suppress Moire patterns.

Each LCD screen in this first embodiment displays a calculated image that is not one image of a viewable stereo image pair, but is rather a derivative of viewable stereopair images. Each calculated image on each LCD screen dynamically derived so as to interact with one another according to the known orientations of the LCD screens to produce collectively a stereo image pair at the output focal planes for viewing. In this regard, the first embodiment of the dynamic image projection system further includes a control device, such as a computer or other electronic controller, adapted to generate the calculated images for displaying and to control the LCDs as necessary to display those calculated images. This control device operates according to preset logic to derive image information from a database of stereopair images stored in a memory unit or other suitable source of base stereopair images. After obtaining a desired stereopair, the control device processes the calculated images to be displayed by the LCDs by estimating the combined light that leaves the front LCD screen. Further, the control device controls the lighting that illuminates the LCD panels or is used by the projectors in order to produce the desired images.

A second embodiment of the dynamic projection system utilizes two electronically controllable image projectors spaced apart on a line perpendicular in orientation relative to the optic path as defined by the optic module. The electronically controllable image projectors can be of any suitable type for displaying images from a computer or other control device, such as the known projectors that have controllable liquid crystal display elements incorporated therein, where the liquid crystal display elements are electronically controllable by a computer device to create and modify the images being projected. In this second embodiment of the dynamic projection system, these image projectors are spaced a known distance and orientation relative to one another, and oriented in a known direction and distance relative to the optic module and the image output planes. Preferably, these electronically controllable image projectors are placed "level" in a plane parallel to planes defined by the eyes of viewers (i.e., in a plane relatively horizontal to ground), and are arranged such that their respective images project in a superimposed manner through the optic module to the image output planes.

Optionally, to provide flexibility in the layout and relative orientations of the projectors and optic module, one or more retro-reflectors, such as mirrors, can be arranged to reflect images projected by the projectors through the optic module.

Similar in operation to the first embodiment of the dynamic image projection system, the electronically controllable projectors utilized in the second embodiment of the dynamic image projection system project calculated images produced by a control device that performs image generation calculations and controls the projectors. This control device is capable of numerically calculating image information and using that information to control the characteristics of the projectors to project stereo images through the optic module in dynamic fashion. In embodiments of the invention wherein the projectors have liquid crystal imaging display elements incorporated therein, the imaging system is adapted to control the liquid crystal display elements within the projectors to modify the images being projected. The calculated image information relates to a desired three-dimensional image scene. The calculated image information in such embodiments causes the liquid crystal displays to be controlled in such a manner that a desired image is produced thereon, and light passes through the display and hits the optic module where its image light field is refracted and diffused in a known manner according to the characteristics of the Fresel lenses to produce free-space images that provide a perception of three-dimensional vision.

The control devices in both embodiments of the dynamic image projection system according to the present invention employ a feedback calculation to calculate the appropriate stereoscopic image pairs to be displayed at any given time. To calculate the derivative images for each LCD or projector in embodiments of the invention, the processor estimates the light directed to each one of a viewer's eyes by calculating interim calculated images for each of said LCDs/projectors, and then determines the combined light exiting each discrete pixel point of the optic module and the light formed at each pixel point of the output image planes. The processor then compares the estimated light for each output image pixel point with the equivalent light from the selected ones of the original source stereopair images to determine an error, and then adjusts the interim calculated images as appropriate to reduce the error in order to keep the error for each pixel below a set limit. Preferably, the calculation of and refining of the derivative images is performed by an artificial neural network that accelerates the iterative process of reducing the error in the calculated images.

In certain embodiments of the invention, the calculated images can optionally be presented to one or more viewers based upon a sensing of one or more viewer's positions. This viewer position signal is generated and sent to the processor by means known in the art, such as by an infrared ("IR") position sensor or radio frequency ("RF") or ultrasonic position tracking sensor, where the processor then in turn retrieves an appropriate image stereopair from the image source for subsequent processing, presentation, and display by the controller of the LCDs or projectors. Further, in such optional preferred embodiments of the invention, such viewer position sensors can be utilized to present a viewer with different aspects of an image as their viewing position changes so as to allow the viewer to view various perspectives of an image in dynamic fashion. The present invention thereby is capable of creating a continuous 3-D image field in a large viewing area with improved image quality, as opposed to a small, discrete, and stationary viewing zone where the image quality greatly deteriorates as the number of viewing zones increases or as viewer position varies.

As described herein, the combination of the optic module configuration and dynamic stereoscopic image projection system according to the present invention provides free-space stereoscopic imaging with each image being formed on a curved output focal plane making those images visible within relatively wide fields of view. This permits an observer to move about the projected focal plane and images such that human cognition will tend to synthesize and interpret an improved three-dimensional effect.

BRIEF DESCRIPTION OF THE DRAWINGS

The invention having thus been described, various preferred aspects and embodiments of the invention will now be described in detail with reference to drawings, in which.

DETAILED DESCRIPTION OF THE PREFERRED EMBODIMENTS

Figure 1A:
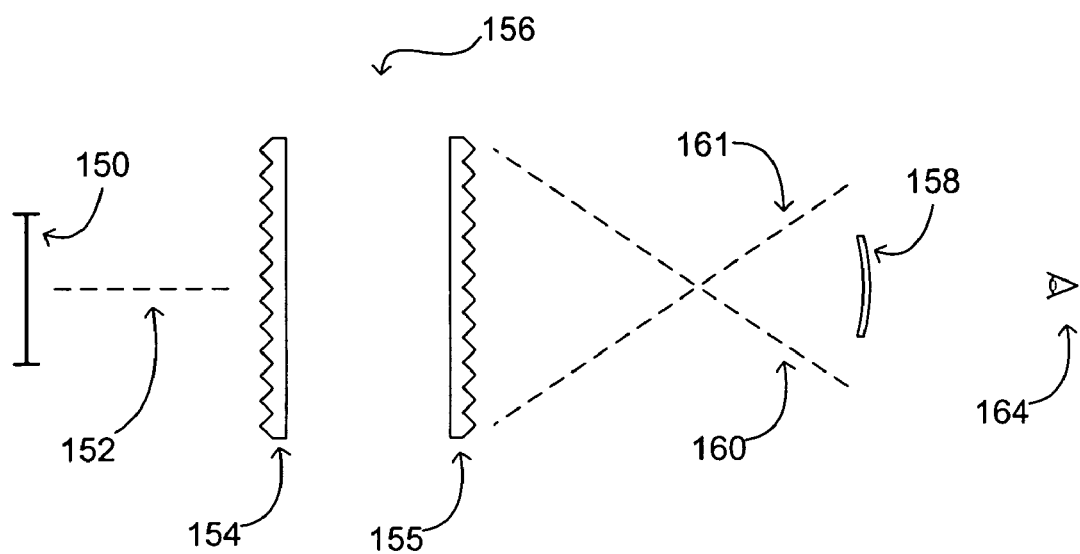
FIGS. 1A and 1B are schematic diagrams depicting Fresnel lenses as arranged into doublet configurations to comprise suitable optic modules according to embodiments of the present invention.

The present invention in its various preferred embodiments is a three-dimensional free space image projection system and related methods for presentation of multiple aspects of dynamic 3-D images using an optic module an a dynamic stereoscopic image projection system. The three-dimensional projection systems and related methods according to the invention generate perceived three-dimensional images in free space through the utilization of lens-type optic modules placed in the projection path of a dynamic stereoscopic image projection system. The optic modules according to embodiments of the present invention are fashioned from Fresnel lenses configured as a doublet to perform in a predictable manner as a single optical component. The dynamic stereoscopic image projection system includes one or more luminous transmission displays, such as one or more liquid crystal display projectors or the like, that project images through the optic modules to form three-dimensional images in the free space on the opposite side of the optic module.

As indicated above, the present invention utilizes Fresnel lenses that are combined optically as a doublet to form a single optic module. As will be readily appreciated by one skilled in the art, Fresnel lenses exhibit typical attributes of refraction and diffraction that can be determined, modeled, and predicted. By adjusting the spacing between the Fresnel lenses forming the doublet optic modules, chromatic astigmatism effects can be altered and/or corrected, and a warped or distorted output focal plane can be created. Such effects can be used to construct a real image in free space, which emulates a substantial portion of a sphere, for example up to about 270 degrees of a sphere. Embodiments of the present invention can therefore be designed to evoke a substantial field angular of view, for example between about 60 and 90 degrees, allowing the observer to move about the curved image and perceive "object parallax." Therefore, a flat image projected through such a Fresnel lens doublet produces a luminous transmission object projected to an output focal plane that is warped, emulating a spherical focal plane. The observer will see, for example, the image of a planet's surface as it varies from one side of the sphere to the other. Fresnel lens doublets employed in embodiments of the present invention also projects such images at a system forward focal length, thereby placing images in free space beyond any confining enclosure. This provides the observer with the perception that he can walk around or through the image.

An important design criteria for systems configured according to the invention is that the echelon grooves of the Fresnel lenses employed in the optic modules be oriented in opposite directions along their common optical path. For example, the echelon grooves may face mutually outwardly in defining the optic module, or may face mutually inwardly toward each other within the common optical path. Suitable Fresnel lenses for use in the present invention can have a typical configuration with the echelon grooves being set with a pitch of about 0.5 mm. While smaller pitches are readily available commercially, for example, to about as small as 0.05 mm, the integrity and quality of the echelon grooves commonly produced with such smaller pitches may be less than satisfactory.

It should also be noted that the echelon groves on Fresnel lenses can be manufactured as either being in positive relief or negative relief. While both types are suitable for use according to the present invention, there type should also be considered when setting up the orientation of the optic module. Certain commercially available Fresnel lenses, for example those marketed by Fresnel Optics, Inc. of Rochester, N.Y., are configured in positive relief. In this regard, the ridges of the echelon grooves extend above the level of the starting outer surface of the acrylic material from which they are formed. Those having negative relief are manufactured with the echelon grooves extending below the surface of the starting acrylic material. Negative relief Fresnel lenses are marketed, for example, by RHK International of Tokyo, Japan. Notably, positive relief Fresnel lenses should be used in the optic modules of the invention in the opposite orientational sense as negative relief Fresnel lenses, as will now be described with respect to FIG. 1A and FIG. 1B.

A determination as to whether the echelon grooves are to face mutually inwardly toward each other or mutually outwardly away from each other is a function of their manufacture. In this regard, their orientation will be opposite depending upon whether they are formed in positive relief or negative relief. This arrangement of the echelon grooves of Fresnel lenses, for a positive relief form of structure, is schematically illustrated in FIG. 1A. As shown in FIG. 1A, an image 150 being projected along the optical path (represented by line 152) common to Fresnel lens 154 and Fresnel lens 155 forming optic module 156. Fresnel lenses 154 and 155 are manufactured to carry positive relief echelon grooves. A substantially planar transmitted focal output plane 158 is shown being produced by image projection lines 160 and 161. As depicted, with this arrangement, the eye station 164 perceives an image coincident with a substantially planar focal plane 158.

Figure 1B:
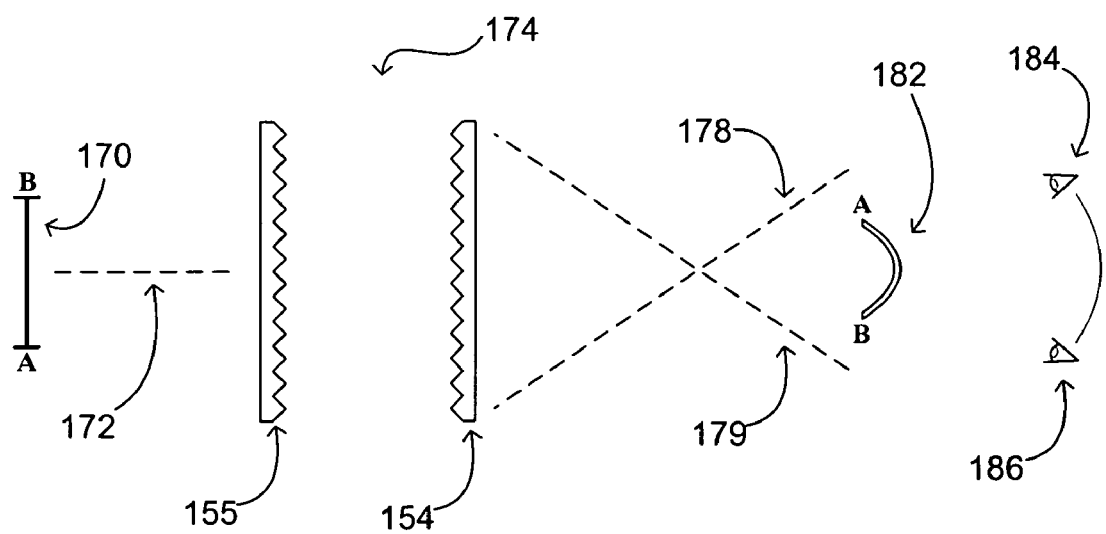

Turning now to FIG. 1B for sake of comparison, the luminous transmission object appears as line 170 having image end position components represented at A and B. This image is positioned within an optical path represented at line 172 for projection to an optic module 174 formed of Fresnel lenses 154 and 155, but this time with the two lenses switched as depicted. In this embodiment, the positive relief Fresnel lenses 154 and 155 are positioned such that their echelon grooves oriented to face mutually inward toward each other along the optical path 172. A resulting projection is represented at projection lines 178 and 179 to create a substantially curved output focal plane 182. The image coincident with the rounded focal plane 182 derives from the flat projected image 170 and a right-left reversal will position the earlier-noted end position components of the image A and B at opposite sides of the focal plane. Thus an observer at eye station 184 will see one side of the projected image including the image component A. Moving within the field of view to eye station 186 provides the observer with a view of image component B. This is a demonstration of object parallax as opposed to spatial parallax.

This optic module configuration as depicted in FIG. 1B avoids the lower "F numbers" required to get a similar warping effect from an individual lens, and thus avoids the attendant problems of unwanted light scatter and glow phenomena. The doublet configuration as depicted provides controlled output field curvature as well as image quality control. Thus, in embodiments of the present invention the echelon groves for positive relief Fresnel lenses should preferably point inward, while the echelon groves for negative relief Fresnel lenses should preferably point outward.

Figure 2:
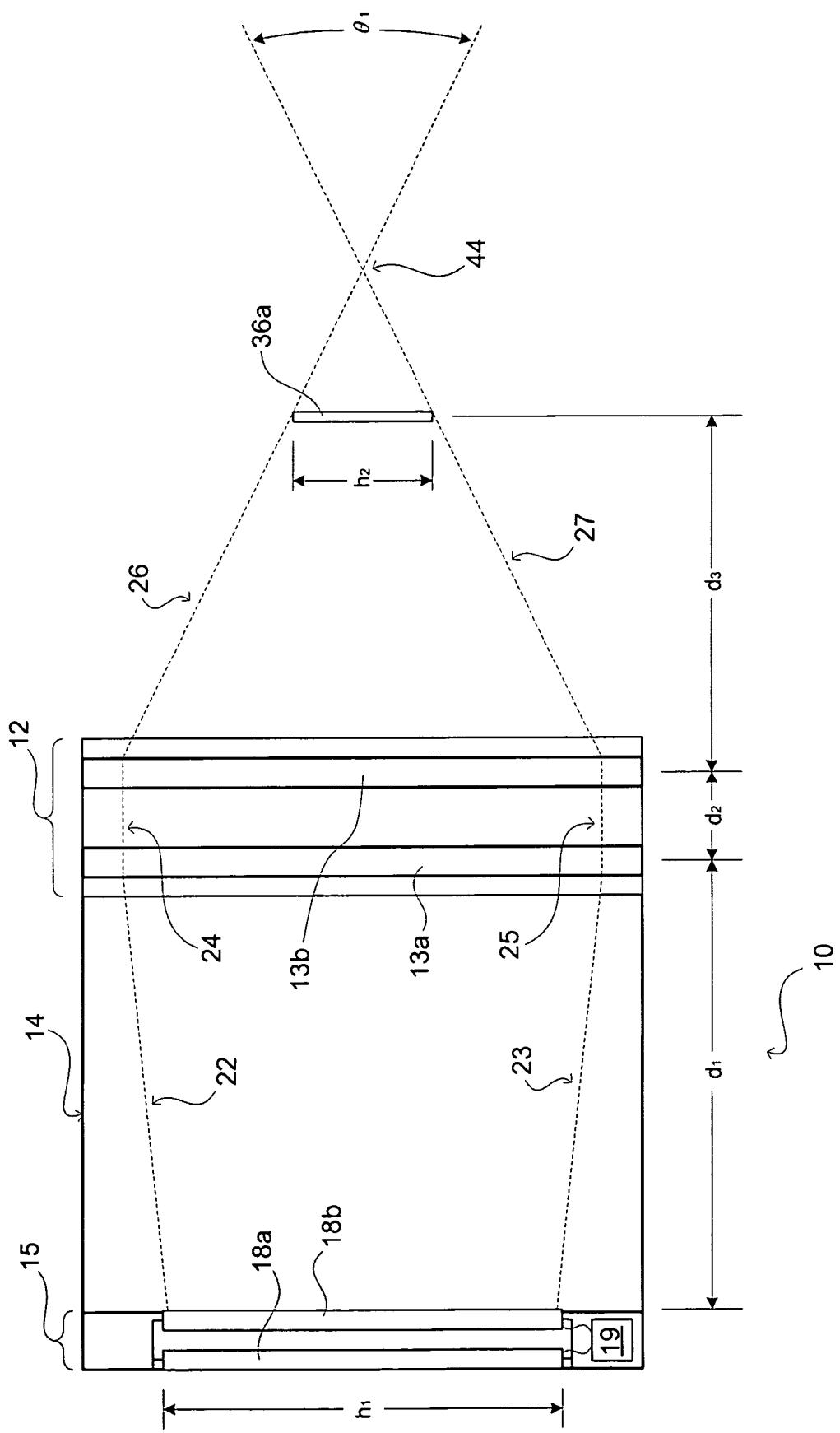
FIG. 2 is a schematic diagram depicting a three-dimensional free space image projection system according to a first embodiment of the present invention.

Referring now to FIG. 2, a first embodiment of the imaging system 10 is represented from a side view. As depicted in FIG. 2, system 10 is configured having an optic module 12 that is formed of two large planar Fresnel lenses 13a and 13b mounted in parallel adjacently within a cabinet 14. For inclusion into an optic module 12, the Fresnel lenses 13a and 13b can typically be formed out of a transparent acrylic, and then sandwiched for sake of protection and support between two pieces of clear Plexiglas covering. The composite acrylic and Plexiglas lens can then be secured in a rectangular frame used to rigidly secure the lens within the optic module.

The exit optic or exit aperture of the optic module 12 is shown as the one side of the second planar Fresnel lens 13b. In this embodiment, the optic module 12 is supported by the cabinet 14 at a height above floor, such as would be a suitable level for accommodating standing observers. For example, cabinet 14 can be mounted within or formed as part of an inner wall of a building to retain all imaging components of the system 10 out of the way and sight of the observers. In the first embodiment as depicted in FIG. 2, the imaging system behind the optic module 12 includes a dynamic stereoscopic image projection system 15 that includes a pair of transmissive LCD screens 18a and 18b of a type known in the art, and a suitable illumination source 11. The LCDs can be of a standard type, having a rectangular shaped display area as is known in the art. Each LCD screen 18a and 18b is controlled by a control device 19, such as a computer or other computing device, to dynamically project calculated images toward and through optic module 12. The LCD screens 18a and 18b are mounted in line perpendicular to the optic path defined by the Fresnel lenses 13a and 13b of the optic module 12 (i.e., the LCD screens and Fresnel lenses are parallel). The images projected by the LCD screens 18a and 18b to the entrance of first Fresnel lens 13a of the optic module 12 as represented by projection lines 22–23. Optic module 12 thereafter bends the light field coming from the LCD screens 18a and 18b and transmits a projected pair of real images in free space, one each at projected image output planes (only one image output plane, plane 36a, being depicted in FIG. 2 as the second plane would be obscured in side perspective).

Figure 4:
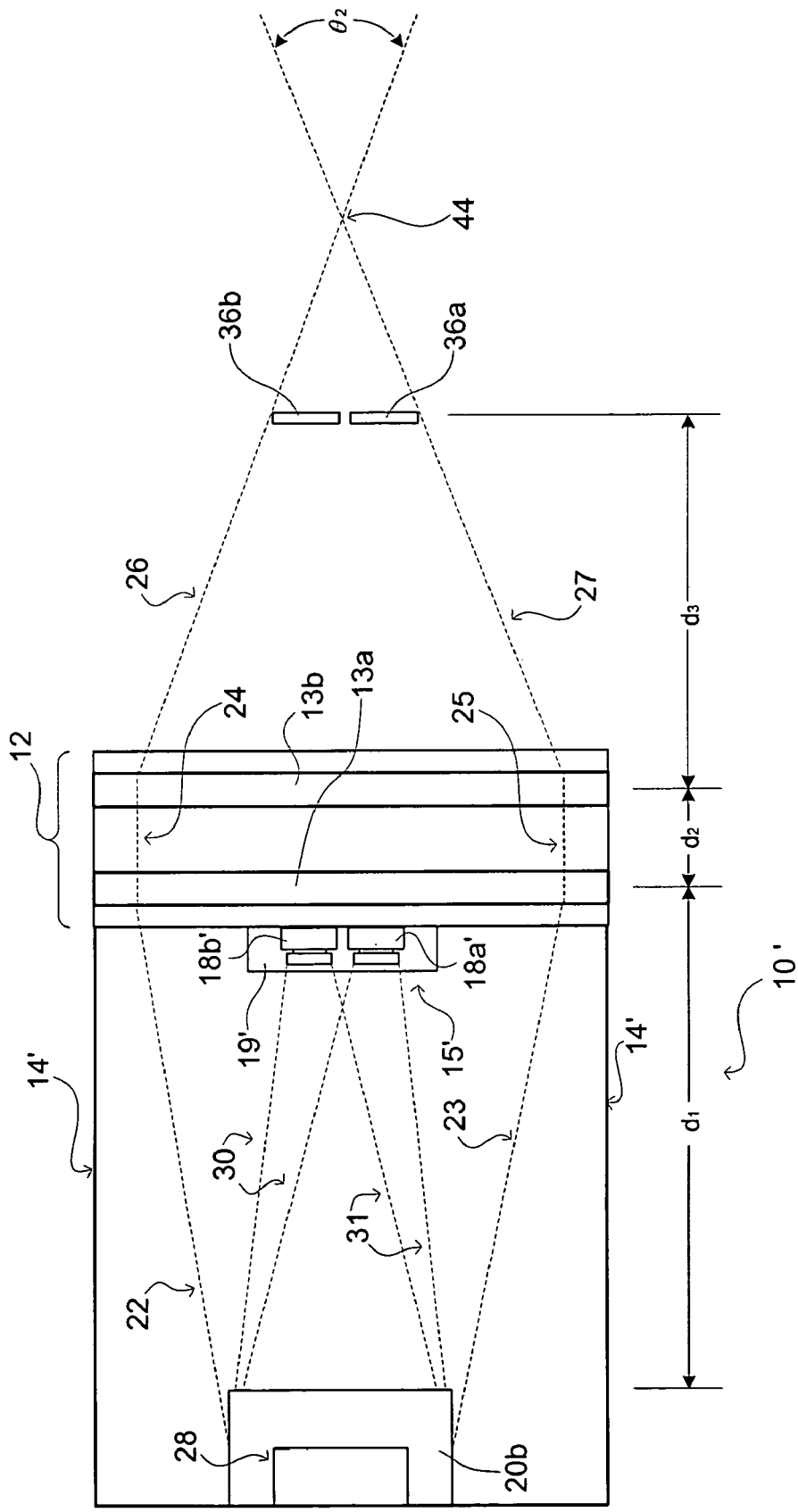
FIG. 4 is a top-view schematic diagram depicting a system for the projection of three-dimensional images according to a second embodiment of the present invention.

Preferably, the images at the projected image output planes are demagnified or reduced in size with respect to the superimposed images produced on the LCD screens 18a and 18b. In a preferred arrangement, the size of the projected image planes is one-half of that of the LCD images. In this regard, where video devices such as the projection video or a computer monitor are utilized, an image which is developed having a pixel-based resolution of 640 pixels by 480 pixels would appear to be an image having a resolution of 1280 pixels by 960 pixels in comparison. The forward projection lines 26 and 27 extending from the optic module 12 (continuing from projection lines 24 and 25 through the optic module 12) converge at a vertex 44 from which they continue outward to define a vertical delimited field of view as represented by the angle $\theta_1$. A horizontal field of view, $\theta_2$ (such as is shown in FIG. 4), although not shown in the figure, would likewise be defined in similar manner if system 10 were examined from a side view perspective.

Also preferably, components of the system 10 are confined within cabinet 14 and behind optic module 12 such that stray illumination or illumination other than that generated by LCD screens 18a and 18b is blocked. Optionally, this confinement can be accomplished for larger scale systems by utilizing a room that is located behind a wall within which the cabinet 14 is mounted. As is apparent, this confinement would not extend in front of the optic module 12 exit aperture so as not to interfere with imaging. By way of example, a size for one system 10 of this first embodiment can provide an image at LCD screen 18b, which screen is 30 inches (76 cm) high and 40 inches (101.6 cm) wide. This particular system will produce a forward or output focal plane 36 being 15 inches high (38 cm) and 20 inches wide (50.8 cm) located about 37 inches (94 cm) forwardly from the exit aperture of the optic module. The Fresnel lenses forming this particular optic module would have a height of 60 inches (1.52 m) and a width of 90 inches (2.29 m).

A second embodiment of the imaging system 10' will now be described with respect to FIG. 3 (in side view) and FIG. 4 (in top view). System 10' is configured having an optic module 12 that is formed of two large planar Fresnel lenses 13a and 13b mounted in parallel adjacently within a cabinet 14', similar in manner with respect to system 10 as described above. The optic module 12 for system 10' can be formed of the same materials and have the same configuration as previously described.

The exit optic or exit aperture of the optic module 12 is shown as the right side of the second planar Fresnel lens 13b. In this embodiment, the optic module 12 is supported by the cabinet 14 at a height above the floor suitable level for accommodating standing observers.

In this second embodiment of the invention, the difference in the imaging system 10' lies in the dynamic stereoscopic image projection system 15'. This projection system 15' alternatively includes a pair of electronically controllable image projectors 18a' and 18b' (projector 18b' only being visible in the top view diagram depicted by FIG. 3) of a type known in the art (as opposed to transmissive LCD screens placed in stacked configuration behind the optic module). Each projector 18a and 18b is controlled by a control device 19', such as a computer, to project an image off of reflector screen 20a, which in turn projects the image onto reflector screen 20b creating two luminous and superimposed images at the screen 20b. Such projection is represented by the projection lines 30–33. Reflector screens 20a and 20b are depicted as being mounted into appropriate position securely within cabinet 14 with brackets 28 or with other suitable means. The superimposed images present on reflector screen 20b are thereafter redirected to the entrance of the first Fresnel lens 13a of the optic module 12 as represented by projection lines 22 and 23. Optic module 12 thereafter bends the light field coming from reflector screen 20b and transmits a projected pair of real images in free space, one each at projected image output planes 36a and 36b. As with projector 18b', image output plane 36b is depicted on in FIG. 3 due to the perspective employed.

The size for a system 10' according to this second embodiment of the invention could likewise produce an image at screen 20b which is 30 inches (76 cm) high and 40 inches (101.6 cm) wide, leading to similar calculations for the output focal plane and Fresnel lens height. Further, the embodiments described above with respect to FIG. 2, FIG. 3 and FIG. 4 would produce a vertical field of view $\theta_1$ of about 60 degrees, and a horizontal field of view $\theta_2$ of about 86 degrees. In general, the field of view $\theta$ for either horizontal or vertical direction is preferred to fall within a range of about 60 to 90 degrees. The field of view should be at least about 30 degrees. FIG. 2, FIG. 3 and FIG. 4 also show a representation $d_1$ for a system back focal length; a spacing between the Fresnel lenses 18a and 18b of $d_2$ and a system forward focal length of $d_3$. For the systems 10 and 10', the system back focal length $d_1$ is 72 inches (1.83 m) and the output focal length $d_3$ is 37 inches (94 cm). These particular orientations of focal length, spacing, and field of views are, of course, only exemplary, and can be readily adapted to other configurations by one of ordinary skill in the art.

Further in regard to the optic modules employed in embodiments of the invention, in each optic module the two Fresnel lenses as 13a and 13b act as a single optical element. Each of the Fresnel lenses exhibits an F number and focal length. However, acting as a doublet, the F number will change, for example, to one-half that of the individual Fresnel lenses. The optic module will typically exhibit an F number of between about 0.5 and 1.5. The spacing of the Fresnel lenses $d_2$ typically will range from about 3 inches to 2 feet, but will be equal to or less than one-half the focal length of one of the Fresnel lenses forming the doublet. As another criterion for the value of the distance of the spacing $d_2$, that spacing should be selected as large enough to avoid the formation of Moire fringe effects at the image output planes. Each of the Fresnel lenses will exhibit a given "F number." However, the F number of the optic module 12 will be different and typically one-half of the F number of the individual lenses forming it when each of the two individual lenses comprising the optic module has the same focal length. The optic module 12 also will exhibit a unique focal distance. When designing systems as at 10, a starting rule of thumb is utilized, wherein the system back focal length $d_1$, is selected as three times the optic module focal length. This will create a system forward focal length $d_3$ of one and one-half times the optic module focal length. In general, this will provide for a reduction in size of the image representing the luminous transmission object at the screen 20b or LCD screen 18b from a principal dimension of $h_1$ to one-half size as shown in FIG. 2. The system back focal length $d_1$ should be at least two times the focal length of the optic module 12 and for special cases has been reduced as low as 1.5 times the optic module focal length. For all cases, the size of the input aperture of optic module 12, and thus Fresnel lens 13a, should be at least as great as the corresponding dimension of the image being transmitted from reflective screen 20 or LCD screens 18a and 18b. One reason for the utilization of optic module 12 is that the optical system can be faster for larger fields of view and other special effects such as that accentuating field curvature. Such fast systems permit the formation of the output image planes at locations closer to the exit aperture.

Fast optical systems are desirable when the design calls for a warped or distorted focal plane. For such designs, it further is desirable to achieve a wider field of view and higher image fidelity. In this regard, it can be desirable to employ two optic modules for such designs. Each optic module in the two optic module alternative embodiment would be constructed in the manner as described above, but this time having two Fresnel lens assemblies mounted within an enclosure forming the optic module. The two optic modules should be separated by at least a minimum distance, which is equal to approximately 2 to 4 times the resulting focal length of the optic module with a typical measurement equal to three times a single optic module's focal length.

Figure 5:
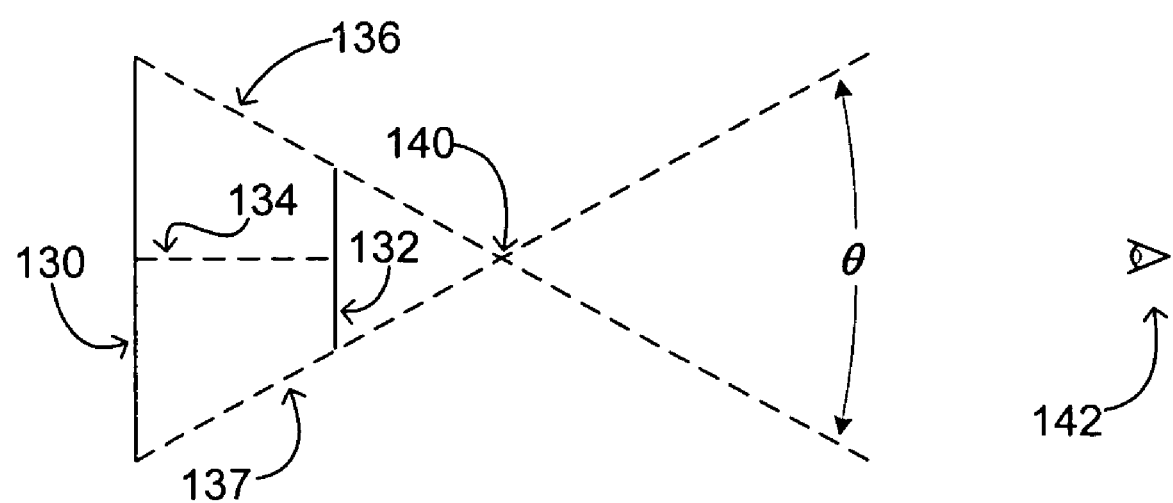
FIG. 5 is a schematic diagram illustrating the concept of how field of view can be determined in embodiments of the present invention.

Field of view is an important attribute of the system, representing a salient aspect to achieving an object form of parallax where the observer eye station may be moved around an image which is coincident with a purposefully warped output focal plane or flat focal plane using chromatic aberration to achieve depth. Such field of view is determined for a given system by considering the attributes of aperture size; projection distance; and projected image size. Looking to FIG. 5, these attributes are schematically represented. In the figure, the output aperture is represented at 130 and the output focal plane is represented at 132. Focal plane 132 is located a projection distance in front of the aperture 130 as is represented by dashed line 134. Projection lines are seen to extend from the extremities of the output aperture 130 to touch the extremities of image 132 as represented by dashed projection lines 136 and 137. Projection lines 136 and 137 cross at a vertex 140 to define the field of view, generically referred to as θ presented before the eye station 142. This angle, θ, readily is determined using conventional plane geometry in conjunction with the values for projected image size, exit aperture size, and projection distance.

The elements, layout and orientation of the embodiments of three-dimensional imaging systems according to the present invention having been thus described, the functional operation of the two alternative embodiments of the dynamic stereoscopic image projection system as utilized by the imaging system will now be described in detail.

According to the first embodiment of the imaging system 10 as described above, stereoscopic images are calculated and projected by using two or more stacked electronic transmissive displays, such as liquid crystal display panels.

Figure 6:
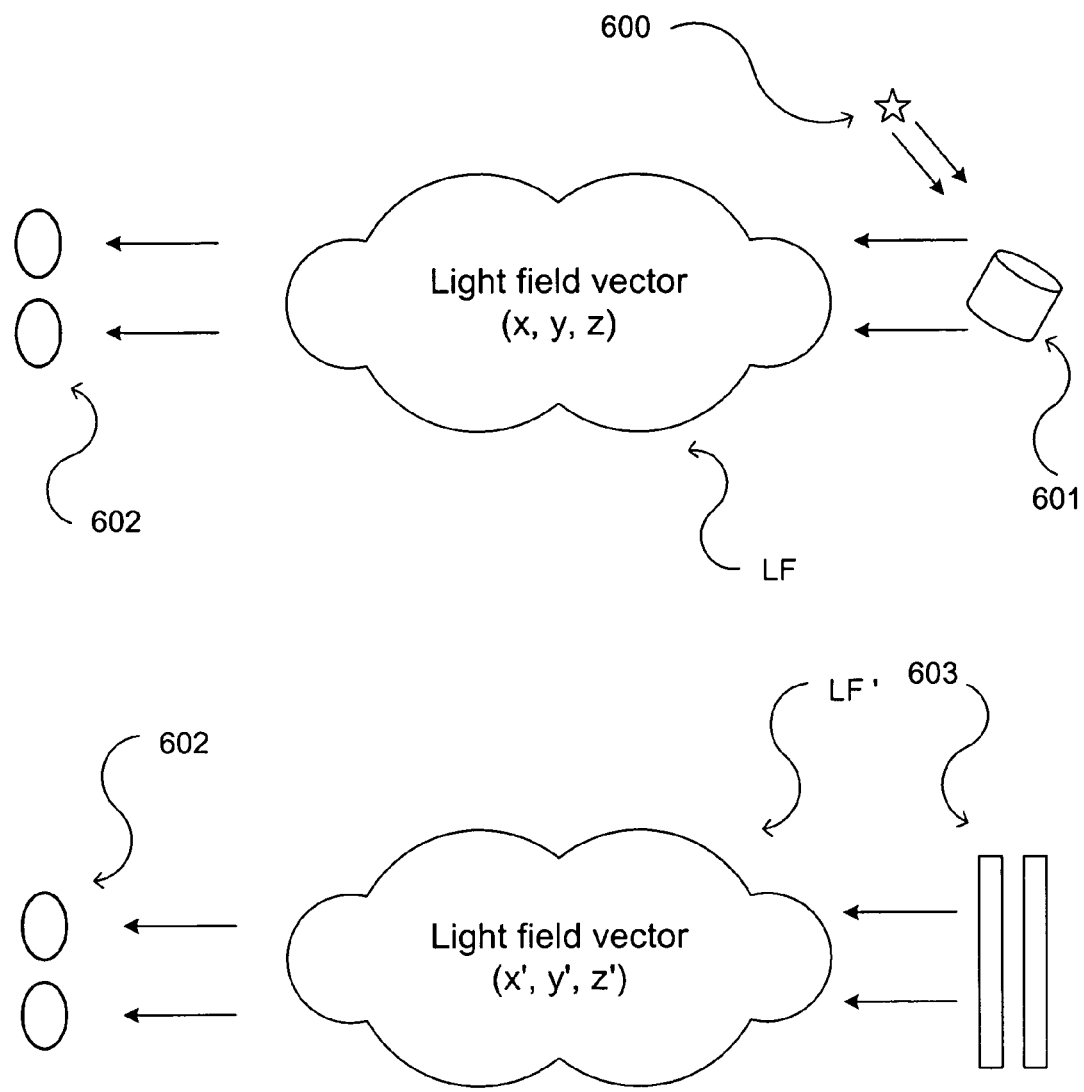
FIG. 6 is a schematic diagram illustrating 3-D light fields created by a real object and illustrating the recreation of such light fields.

FIG. 6 illustrates how humans can see real objects in three dimensions as light 600 reflects from an object 601 and generates a light field LF in space. The two eyes 602 of a viewer perceive this light field differently due to each eye's different location in space relative to the object, and the brain of the viewer processes the different perceptions of the light field by the two eyes to generate three-dimensional perception. FIG. 6 also shows a second light field LF' being formed from the electronic transmissive displays 603 of a dynamic projector system according to the first embodiment above, whereby LF' is nearly identical to LF and creates a second perceived stereoscopic image. The basic quality of any three-dimensional imaging system depends on the magnitude of the difference between LF and LF', i.e., how close the imaging system can come to recreating LF. If the second stereoscopic light field is recreated to be substantially similar to the original light field LF, the viewer of LF' will perceive a good recreation of the original object image in three dimensions.

Figure 7:
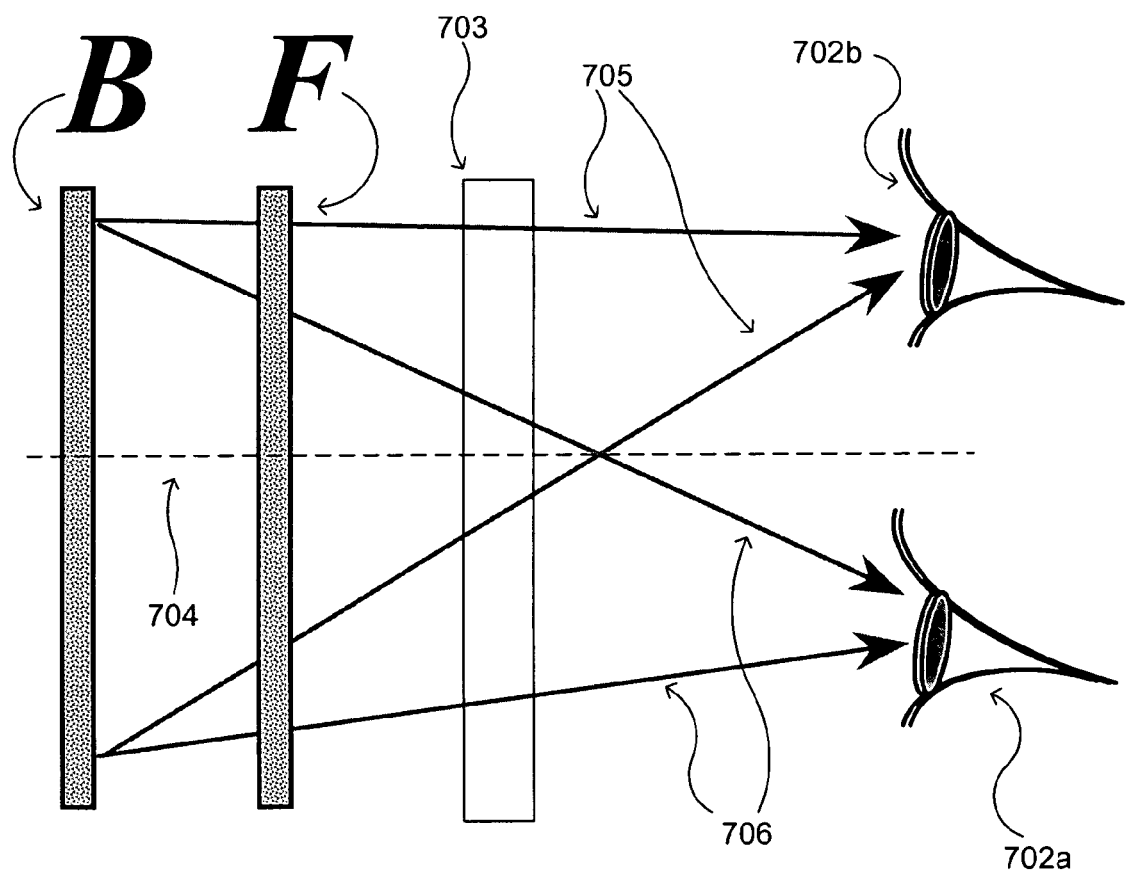
FIG. 7 is a schematic diagram depicting the orientation of a viewer with respect to the display panels in order to generate stereoscopic images in a first embodiment of the invention.

The dynamic image projection system 15 depicted above utilizes two or more stacked transmissive display panels 603 as shown in FIG. 6, but with each panel cooperating to display derivative images of the stereopair images that are desired to be displayed through the Fresnel lens optic module to the viewer's two eyes. The derivative images interact and effectively mask one another to produce collectively the two stereo images to be viewed. As shown in FIG. 7, transmissive display panels in embodiments of the present invention are stacked in orientation relative to the optical path 704 of optic module 703, as well as relative to the viewer (viewer position denoted in FIG. 7 by the left and right eye 702*a* and 702*b*, respectively). As depicted in the drawing, each eye 702*a* and 702*b* has a different view path to the back B and front F panels (as shown by view lines 705 and 706), which view path causes the images on the panels to be summed together and perceived by the viewer as stereoscopic images for the eyes 702*a* and 702*b*.

Figure 8:
FIG. 8 is an illustration of exemplary calculated images that could be displayed on the display panels of FIG. 7 to generate stereoscopic images.
Figure 8:
Figure 9:
FIG. 9 is an illustration of exemplary perceived stereoscopic images that could be seen by a viewer when the images of FIG. 8 are displayed on the display panels of FIG. 7.
Figure 9:

FIG. 8 illustrates an example of such derivative images 801 and 802 adapted for the back panel B and front panel F, respectively. As depicted in the drawing, the derivative images displayed on each of the panels can appear blurred and chaotic when viewed independently and separately. However, when viewed simultaneously with the panels B and F in the proper orientation as depicted in FIG. 7, the derivative images will produce appropriate stereoscopic images 901 and 902 for the left and right eyes of the viewer, respectively, as depicted in FIG. 9.

To calculate the derivative images for the LCD screens in this first embodiment of the invention, a processor estimates the light directed to each one of a viewer's eyes by calculating interim calculated images for each of the LCD screens, and then determines the light directed through each discrete pixel of the front LCD screen. The processor then compares the estimated light for each pixel with the equivalent light from the selected ones of the original source stereopair images to determine an error, and then adjusts the interim calculated images as appropriate to reduce the error in order to keep the error for each pixel is below a set limit.

An iterative algorithm evaluates the differences between the generated images and the original image. Based on the differences between them, the algorithm dictates screen imaging adjustments. These screen adjustments cause changes to the generated images making them more identical replicas of the original (i.e. approaching maximum exactness). For example, this iterative process can require several iterations, such as 3 to 7 iterations, to render each frame within acceptable error.

Figure 10:
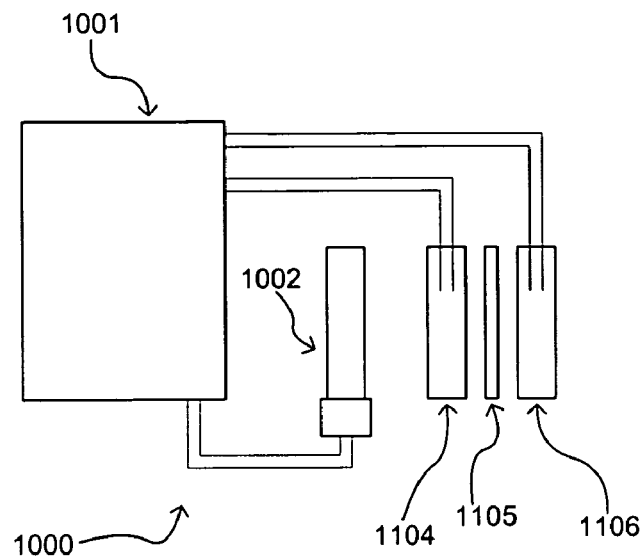
FIG. 10 is a schematic diagram illustrating components of a dynamic stereoscopic image display system in accordance with a first embodiment of the invention.

FIG. 10 shows the basic components of a LCD based imaging system 1000 in accordance with one version of the first embodiment of the invention. In the drawing, a distant and nearest (hereinafter called near) transmissive display screens 1004 and 1006 (which may be transmissive liquid crystal displays) are separated by a gap in which, optionally, a spatial mask 1105 can be placed. This mask may be pure phase (e.g., lenticular or random screen), amplitude or complex transparency, including another transmisive display. The screens are controlled by a computing device 1001, such as a personal computer, a video controller, or other suitable digital processing device. As will be discussed in detail below, the display system depicted relies on the calculation of images by the computing device 1001 that are then displayed on the distant and near screens 1004 and 1006 to produced perceived stereo images in the viewer eyes. A suitable illumination source 1002 is also shown, which is also controlled by computing device 1001.

Figure 11:
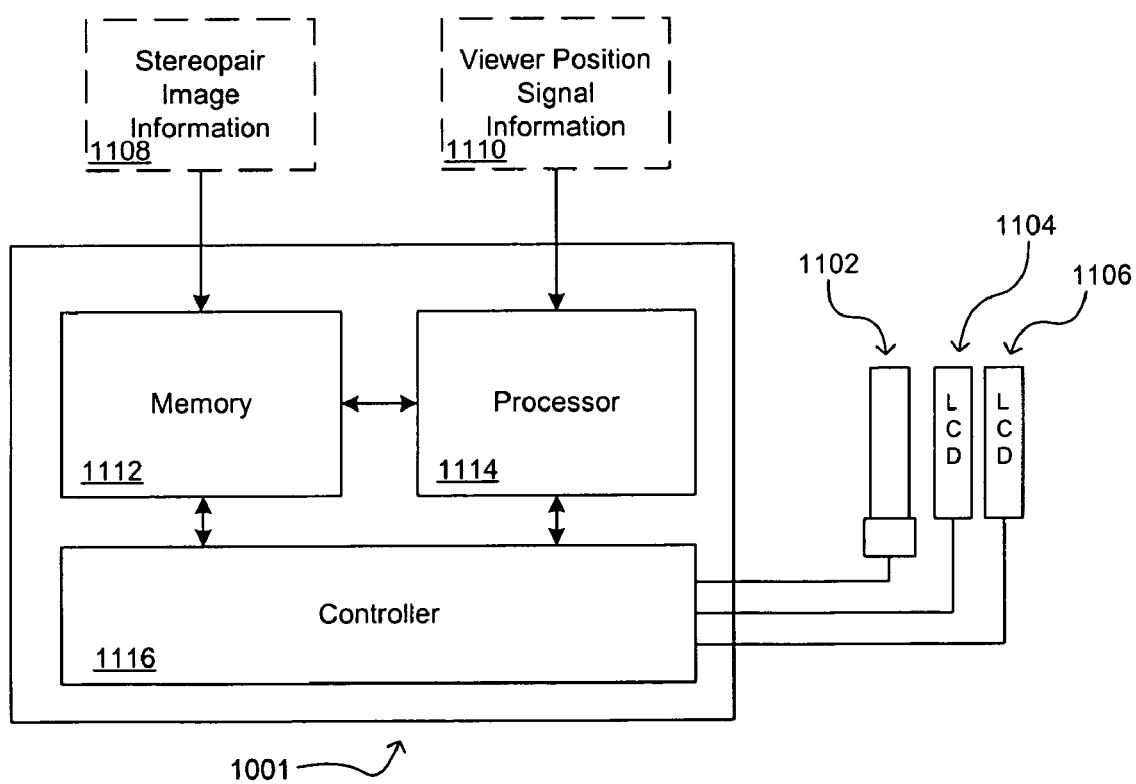
FIG. 11 is a schematic diagram illustrating the computational and control architecture utilized to derive calculated images in accordance with embodiments of the invention.

FIG. 11 illustrates the detail for the computing device 1001, depicting the computational and control architecture utilized to generate 3-D images in accordance with that embodiment of the invention. Although disclosed in this embodiment as including a viewer position signal input 10, it will be understood by one of skill in the art that the invention can also be practiced without this feature by defining a set viewing zone or multiple set viewing zones. The invention comprises a database of stereopairs or aspects that are also provided as an input 1108 to the memory unit 1112. Memory unit 1112 has several functions. Initially memory unit 1112 will extract and store a particular stereopair from the input 1108 source (such as a database in memory or storage). This stereopair will correspond to an initial viewing position. As noted above, a viewer position sensor 1110 can provide a viewer position signal to processor 1114.

Generally, a minimum of two image information streams, corresponding to left eye and right eye images, are needed to generate a 3-D image in embodiments of the present invention. While above it was stated that the stereopair source images could be stored in and retrieved from a database in another memory or storage location (including stored previously in memory 12), the source image information may come ultimately from a variety of sources. For example, the information streams may include one or more pairs of camcorders or paired video streams for live 3-D video or recorded 3-D video, left and right images of one object (e.g., for photos) and left and right views from 3-D scene (e.g., for games).

All during the viewing session, the viewer position signal 1110 is constantly monitored and provided to processor 1114. Depending upon the viewer position and subsequent error processing as noted (below), information from processor 1114 regarding viewer position 1110 (or preset location of the user for stationary viewing zones) is provided to memory 1112 for subsequent extraction of the stereopair aspects from the database and recalculation of derived images for the displays 1104 and 1106. Thus the present invention can constantly provide an updated series of stereopairs to the processor based upon the input viewer position signal if the viewer desires to see the 3-D object from various positions. If the viewer desires to see a single 3-D view of an object, regardless of the viewing position, the viewer position signal input 1110 can be used to determine the optical geometry used in the required processing. As will be readily appreciated by one skilled in the art, multiple viewer position signals can similarly be used to created multiple viewing zones (including with different images or image aspects) as is described below.

Memory 1112 provides the desired stereopair to the processor 1114 to produce calculated images. The calculated images can be directly sent from processor 1114 to LCD panel and lighting unit control 1116 or stored in memory 1112 to be accessed by control unit 1116. Unit 1116 then provides the calculated images to the appropriate LCD panels 1104 and 1106 as well as controls the lighting that illuminates the transmissive LCD panels 1104 and 1106. Processor 1114 can also provide instructions to LCD and lighting control unit 1116 to provide the appropriate illumination.

It should be noted that memory 1112 holds the accumulated signals of individual cells or elements of the liquid crystal display. Thus the memory unit 12 and processor 1114 have the ability to accumulate and analyze the light that is traveling through relevant screen elements of the LCD panels toward the right and left eyes of the viewer which are identified by the processor 1114 based upon the set viewing zone(s) or the viewer position signal 1110.

Figure 12:
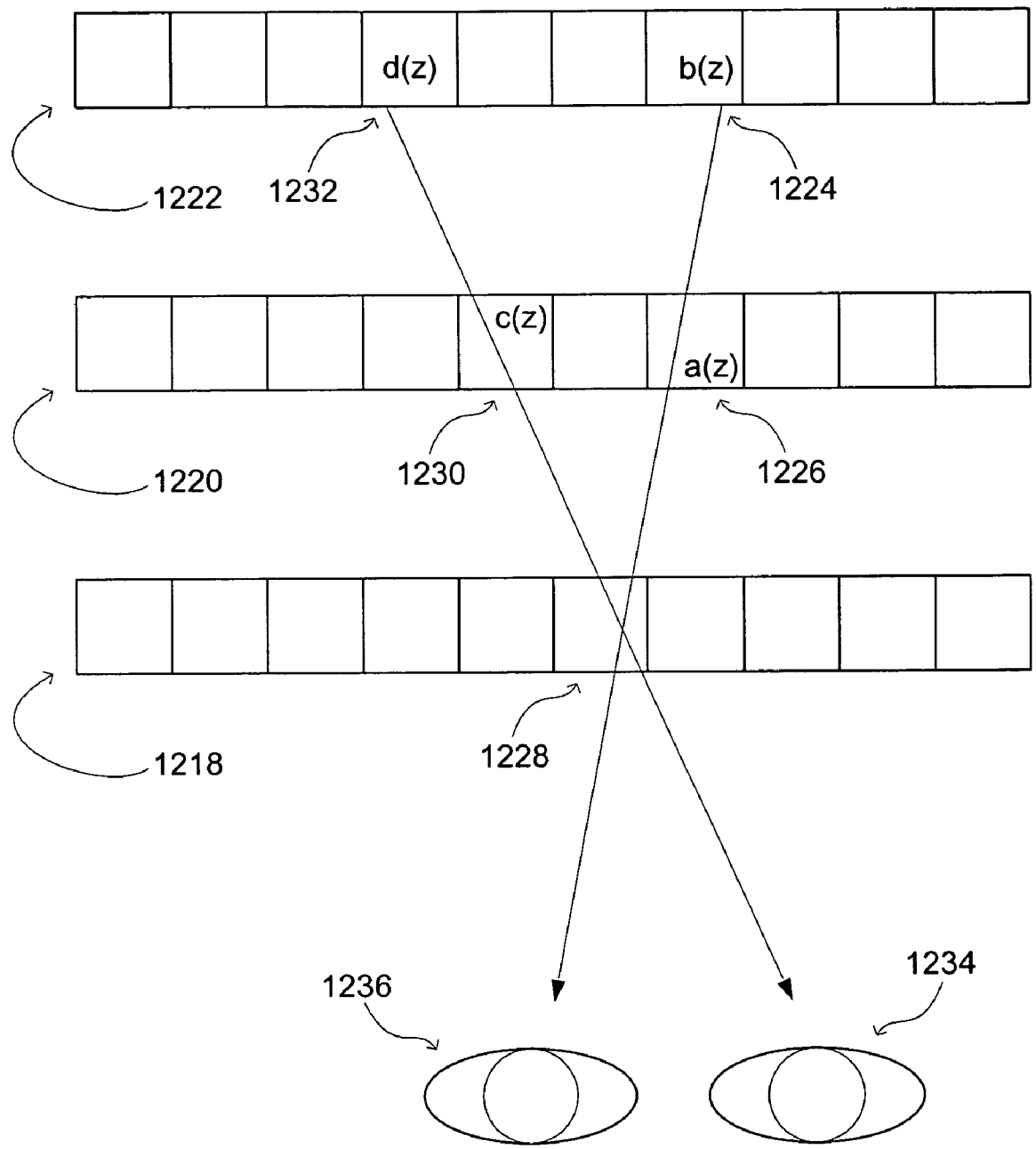
FIG. 12 is a schematic diagram that depicts the light beam movement from display panels to a viewer's eyes in accordance with a first embodiment of the invention.

FIG. 12 schematically depicts the light beam movement from display panels to a viewer's eyes. As illustrated in FIG. 12, two light beams will come through the arbitrary cell z 1228 on the near screen 1218 in order to come through the pupils of eyes 1234 and 1236. These beams will cross mask 1220 and distant screen 1222 at the points a(z) 1226 and c(z) 1230, b(z) 1224 and d(z) 1232, respectively. The image in the left eye 1236 is a summation of:

$$SL_z = N_z + M_{a(z)} + D_{b(z)},$$

where N is the intensity of the pixel on the near screen 1218, M is the intensity of the pixel on the mask 1220, and D is the intensity of the pixel on the distant screen 1222.

For right eye 1234, respectively, the summation is:

1. $SR_z = N_z + M_{c(z)} + D_{d(z)},$

When light is directed through all the pixels z(n) of near screen 1218, the images SL and SR are formed on the retinas of the viewer. The aim of the calculation is a optimizing of the calculated images on the near and distant screens 18 and 22 to obtain

1. SL→L, and

2. SR→R.

One can prove that it is impossible to obtain an exact solution for the arbitrary L and R images. That is why the present invention seeks to find an approximated solution in the possible distributions for N and D to produce a minimum quadratic disparity function (between target and calculated images):

$$\rho(SL - L) \xrightarrow[N,D]{} \min$$

$$\rho(SR - R) \xrightarrow[N,D]{} \min$$

where ρ(x) is a function of the disparity, with the limitation of pixel intensity to $$0 \leq N \leq 255, 0 \leq D \leq 255$$

for constant M. An artificial Neural Network ("NN"), such as described below with respect to FIG. 114, may be used for this problem solving because of the following specific features: parallel processing and DSP integrated scheme application.

Figure 13:
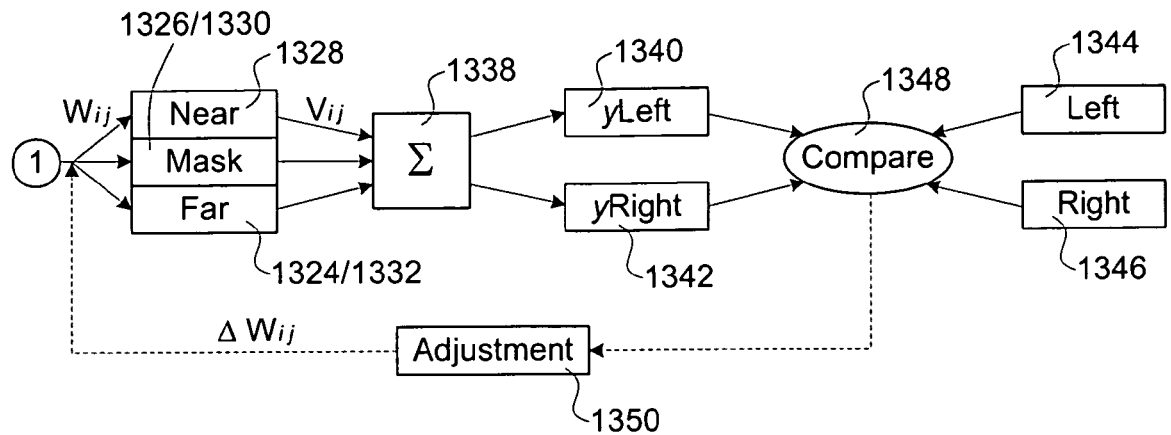
FIG. 13 is a logical and schematic flow diagram illustrating the data flow for the operation of the display control program in accordance with embodiments of the invention.

Referring now to FIG. 13, the data flow for the manipulation of the images of the present invention is illustrated. As noted earlier the memory unit 1112, processor 1114, and LCD control and luminous control 1116 regulate the luminous radiation emanating from the distant screen 1222 and the transmissivity of the mask 1220 and near screen 1218.

Information concerning multiple discreet two dimensional (2-D) images (i.e., multiple calculated images) of an object, each of which is depicted in multiple different areas on the LCD screens, and, optionally, information about positions of the right and left eyes of the viewer are adjusted by the processor 1114.

Signals corresponding to the transmission of a portion 1328 of near screen 1218, the transmissivity of mask 1220 corresponding to the left and right eye respectively (1326, 1330) and the distant screen 1222 corresponding to the luminous radiation of those portions of the image of the left and right eye respectively (1324, 1332) are input to the processor following the set program.

The light signals from the cells of all screens that are directed toward the right and left eye of each viewer are then identified. In this example signals from cell 1228, 1226, and 1224, are all directed toward the left eye of the viewer 1236 and signals from block 1228, 1230, and 1232 are directed the right eye of the viewer 1234.

Each of these left and right eye signals is summed 1338 to create a value for the right eye 1342 and the left eye 1340. These signals are then compared in a compare operation 1348 to the relevant parts of the image of each aspect and to the relevant areas of the image of the object aspects 1344 and 1346. An adjustment 1350 can then be made as necessary to effect a change ($\Delta W_{ij}$) to weights applied to the screens (and mask, if present) as described further below.

Keeping in mind that the signal is a function of the location of the viewer's eyes, the detected signal can vary to some extent. Any errors from the comparison are identified for each cell of each near mask, and distant screen. Each error is then compared to the set threshold signal and, if the error signal exceeds the set threshold signal, the processor control changes the signals corresponding to the luminous radiation of at least part of the distant screen 1222 cells as well changes the transmissivity of at least part of the mask and near cells of the LCD displays.

If the information concerning the calculated images of the object changes, as a result of movement of the viewer position, the processor senses that movement and inputs into the memory unit signals corresponding to luminous radiation of the distant screen cells as well as the transmissivity of the mask and near screen cells until the information is modified. When the viewer position varies far enough to require a new view, that view or image is extracted from the database and processed.

Figure 14:
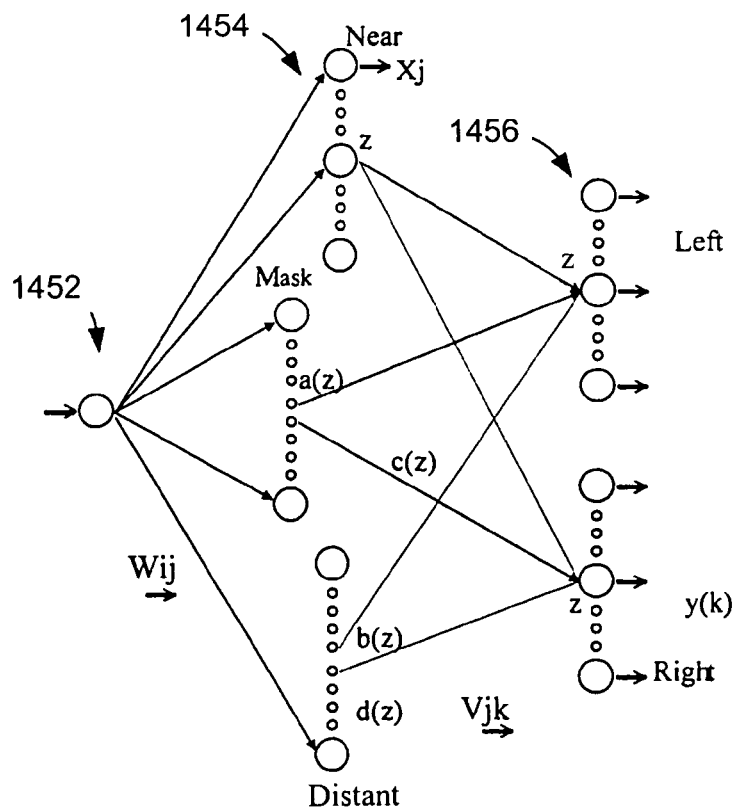
FIG. 14 is a schematic diagram illustrating a neural network algorithm used to determine image data in accordance with an embodiment of the invention.

FIG. 14 shows a neural network architecture that is applied to the problem described above in accordance with an embodiment of the invention. In calculating the images on the far and near screens, it helps to assume that there are L and R, a left and a right pair of stereo source images, and a constant viewing-zone (assuming the viewers eye positions is constant). A spatial mask of an amplitude-type will be assumed for simplicity. The neural network of the invention replicates the function of the human eye by generating an image at the mid-point between two shown panels. To generate these images, the neural algorithm reduces the differences between the original light field of the object (the source images) and the panel generated light field. The difference between the light fields is called the maximum exactness (or minimum error), and is reduced until sufficient exactness within the range of human perception is achieved. The neural network architecture shown in FIG. 14 is a three layer neural network. An input layer 1452 consists of one neuron that spreads the unit excitement to the neurons of the hidden layer 1454. The neurons of the hidden layer 1454 form three groups that correspond to the near and distant screens and the mask. The neurons of an output layer 1456 forms two groups that correspond to images SL and SR. The number of neurons corresponds to the number of LCD screens pixels. Synaptic weights $W_{ij}$ that corresponds to the near and distant screens is an adjusting parameter, and $W_{ij}$ of the mask is a constant. Synaptic interconnection between hidden layer neurons corresponds to the optical scheme of the system:

$$V_{j,k} = \begin{cases} 1 & \text{—if } j = k \ \& \ k, a(k), b(k) \text{ is on the same line} \\ & \text{or } j = k \ \& \ k, c(z), d(z) \text{ is on the same line} \\ 0 & \text{—otherwise} \end{cases}$$

Nonlinear functions are a sigmoid function in the value [0-255]:

$$F(x) = \frac{255}{1 + \exp(-x)}.$$

The functioning of the NN can be described by:

$$X_j = F\left(\sum_j W_{ij} Inp_i\right) = F(W_{1j}) = \begin{cases} D_j & \text{—if } j \in D \\ M_j & \text{—if } j \in M \\ N_j & \text{—if } j \in N \end{cases} \text{—output of hidden layer}$$

$$Y_k = F\left(\sum_k V_{ik} X_j\right) \text{ —output of the NN.}$$

The output signal in any neuron is a summation of at least one signal from the distant and near screens and the mask. The output of the NN corresponding to the left and right eye of the viewer, is defined by $$Y_k(\text{left}) = F(X_z + X_{a(z)} + X_{b(z)}) = F(N_z + M_{a(z)} + D_{b(z)})$$

$$Y_k(\text{right}) = F(X_z + X_{c(z)} + X_{d(z)}) = F(N_z + M_{c(z)} + D_{d(z)})$$

The relevant error function therefore is:

$$E = \sum_k \rho(Y_k(\text{left}) - L_k) + \sum_k \rho(Y_k(\text{right}) - R_k)$$

that is the summation of all the errors. From above, it is evident that when E→0 while NN learning, the output of the hidden layer will correspond to the desired calculated images to be illuminated on the screens. NN learning.

In the initial step, the weights $W_{ij}$ have random values. A back propagation method (BackProp) was used to teach the NN:

$$W_{ij}(\text{new}) = W_{ij}(\text{old}) - \alpha \frac{dE}{dW_{ij}}$$

where α accounts for the velocity of the learning. The experiments show that an acceptable accuracy was obtained at 10–15 iterations, for some images the extremely low errors can be achieved in 100 iterations. The calculations show the strong dependence between the level of errors and the parameters of the optical scheme, such as the shape of the left and right images, L and R, the distance between the near and distant screens and the mask, and the viewer eye position.

For obtaining more stable solutions for small variations of the optical parameters, two alternative methods can be used. The first method involves modification of the error function, by adding a regularization term:

$$E = \sum_k \rho(Y_k(\text{left}) - L_k) + \sum_k \rho(Y_k(\text{right}) - R_k) + \beta \frac{W_{ij}^2}{2}$$

where β is a regularization parameter.

The second method involves randomly changing the position of the viewer eye by a small amount during the training of the NN. Both of these methods can be used for enlarging of the area of stereo viewing.

Training methods other than "BackProp" can also be used, for example, a conjugated gradients method:

$$W_{ij}(t) = W_{ij}(t-1) + \alpha(t) S_{ij}(t-1),$$

$$S_{i,j}(t) = -G_{ij}(t) + \frac{\|G_{ij}(t)\|^2}{\|G_{ij}(t-1)\|^2} S_{ij}(t-1)$$

$$G_{ij}(t) = \frac{dE}{dW_{ij}}$$

which is a variant of Fletcher-Reeves. This will accelerate the training procedure 5–10 times.

A typical system to employ the present invention consists of two typical AM liquid crystal displays having a resolution of about 1024×768, and a computer system, preferably using an Intel Pentium III-500 MHz equivalent or faster processor, for stereo image processing. In a 15" LCD screen system, for example, the distance between the panels should be approximately 5 mm, and the mask comprises a diffuser. A suitable diffuser type is a Gam fusion number 10–60, made available by Premier Lighting of Van Nuys, Calif., which has approximately a 75% transmission for spot intensity beams as less diffusion may lead to visible moire patterns. The computer emulates the neural network for obtaining the calculated images that must be illuminated on the near and distant screens in order to obtain separated left-right images in predefined areas. The neural network emulates the optical interaction of the displayed derived images as described above and takes into account the viewer's eye position in order to minimize the errors in the stereo image and dynamically produce a perceived 3-D image.

Given the compact nature of the arrangement of multiple liquid crystal display panels, and potentially a diffuser, in certain embodiments of the invention, it is important to provide suitable cooling for the panels to prevent overheating. One way suitable cooling can be provided is by utilizing an arrangement of fans within the display casing (which typically, in commercial embodiments, would encase at least the display panels and light source) to provide a cooling cross-flow of air. As described above, the inclusion of a means for inputting a viewer position signal enables display systems according to the present invention to use both a set image viewing zone (or zones) or no zones that allow viewers to move without losing 3-D effect. The algorithms used to determine components of the derived images (such as SL and SR above) use variables for the optical geometry, and the viewer position signal is used to determine those variables. Also, the viewer position signal may be used to determine which stereopair to display, based on the optical geometry calculation, when the display is in a mode that allows viewer position changes to change the image view or perspective seen by the viewer. Numerous known technologies can be used for generating the viewer position signal, including known head/eye tracking systems employed for virtual reality (VR) applications, such as, but not limited to, viewer mounted radio frequency ("RF") sensors, triangulated infrared ("IR") and ultrasound systems, and camera-based machine vision using video analysis of image data.

The signals corresponding to the transmissivity of the near and distant screens' cells are input into the memory unit by means of the processor following the set program. The next step is to identify the light signals that can be directed from the cells of all the screens towards the right and left eyes of at least one viewer. Then compare the identified light signals directed towards each eye to the corresponding areas of the set of 2-D stereopair images of the relevant object.

For each cell of each screen, the error signal is identified between the identified light signal that can be directed towards the relevant eye and the identified relevant area of the stereo picture of the relevant object aspect that the same eye should see. Each received error signal is compared to the set threshold signal. If the error signal exceeds the set threshold signal, the mentioned program of the processor control modifies the signals corresponding to the screen cells. The above process is repeated until the error signal becomes lower than the set threshold signal or the set time period is up.

It must be mentioned specifically that all calculations can be performed in parallel utilizing, for example, DSP processors designed for this purpose.

The algorithm in accordance with the invention can be adapted for use with different hardware configurations including a computer central processing unit (e.g. Intel chips) and 3-D video cards (e.g., nVidia GeForce, or ATI Radeon) supporting dual monitor configurations. Furthermore, hardware such as known 3-D accelerators can be used operate the algorithm more quickly.

As will be readily appreciated by one skilled in the art, in certain embodiments of the invention, the light source can be a substantially broadband white-light source, such as an incandescent lamp, an induction lamp, a fluorescent lamp, or an arc lamp, among others. In other embodiments, light source could be a set of single-color sources with different colors, such as red, green, and blue. These sources may be light emitting diodes ("LEDs"), laser diodes, or other monochromatic and/or coherent sources.

In embodiments of the invention, the liquid crystal display panels comprise switchable elements. As is known in the art, by adjusting the electric field applied to each of the individual color panel pairs, the system then provides a means for color balancing the light obtained from light source. In another embodiment, each color panel system can be used for sequential color switching. In this embodiment, the panel pairs include red, blue, and green switchable panel pairs. Each set of these panel pairs is activated one at a time in sequence, and display cycles through blue, green, and red components of an image to be displayed. The panel pairs and corresponding light sources are switched synchronously with the image on display at a rate that is fast compared with the integration time of the human eye (less than 100 microseconds). Understandably, it is then possible to use a single pair of monochromatic displays to provide color stereoscopic images.

The functional operation of the second alternative embodiment of the dynamic stereoscopic image projection system as utilized by the imaging system will now be described in detail. This embodiment employs dual projector units as opposed to stacked LCDs are described above.

Figure 15:
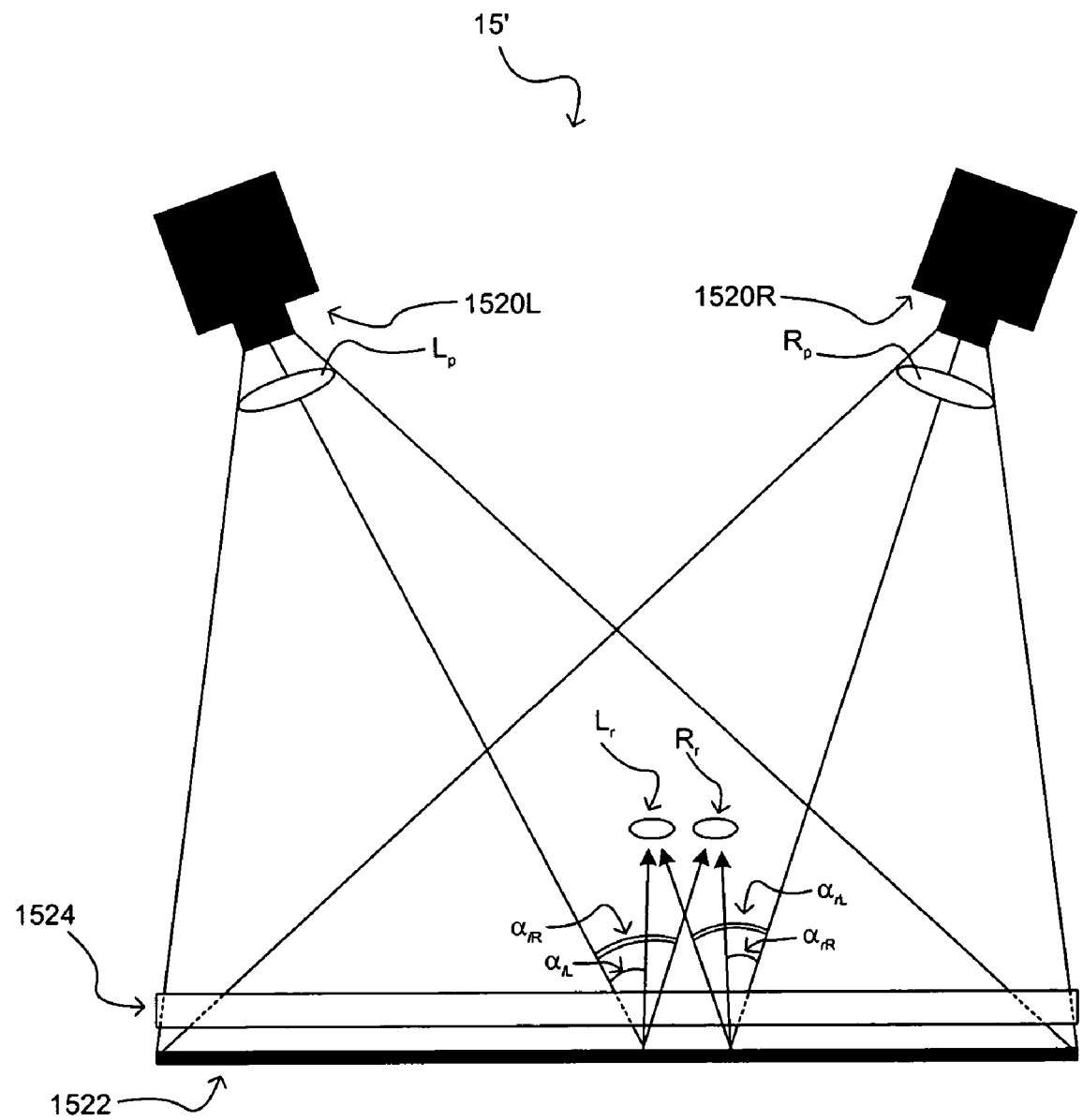
FIG. 15 is a schematic diagram illustrating the arrangement of components of a dynamic stereoscopic image display system in accordance with a second embodiment of the invention

FIG. 15 schematically depicts the projection of three-dimensional images according to the second embodiment of the dynamic image projection system 15' as described herein. As illustrated in FIG. 2, a stereographic image is presented to a viewer using at least two projectors 1520L and 1520R to project calculated image $L_p$ and calculated image $R_p$, respectively, such as formed by respective transmissive LCD elements in the projectors or other similar pixel-based displays, onto the retro-reflective screen 1522, or multiple retro-reflective screens (not depicted), and then through the optic module 1524 to present appropriate retro-reflected images $L_r$ and $R_r$ to the viewer's left and right eyes.

The retro-reflective screen 1522 can be any type of suitable reflector. In certain instances, the retro-reflective screen 1522 can reflect the project image light according to a non-linear distribution pattern that depends upon the angle of reflection between the light origination source and the surface of the screen. For example, the reflected light distribution could be, for example, in accordance with a Gaussian distribution wherein light intensity $I(\alpha)$ can be represented by the equation $$I(\alpha) = I_0 \cdot \exp\left(-\frac{\alpha^2}{\sigma^2}\right)$$

at the viewing point at the angle $\alpha$. The peak intensity of the light is given by the constant $I_0$, and $\sigma$ is a constant and depends on the screen characteristics of the particular retro-reflective screen employed.

With respect to the two-projector embodiment of FIG. 15, the observed image for the left and right eyes can be mathematically presented as:

$$I(L) = I_{0l} \cdot \exp\left(-\frac{\alpha_{lL}^2}{\sigma^2}\right) + I_{0r} \cdot \exp\left(-\frac{\alpha_{rL}^2}{\sigma^2}\right)$$

$$I(R) = I_{0l} \cdot \exp\left(-\frac{\alpha_{lR}^2}{\sigma^2}\right) + I_{0r} \cdot \exp\left(-\frac{\alpha_{rR}^2}{\sigma^2}\right)$$

where, in the above equations, $I_{ol}$ is the brightness of the left projector image, and $I_{0r}$ is the brightness of the right projector image. By fixing I(L) and I(R) for any specific point, one can generate the system of equations for $I_{ol}$ and $I_{0r}$, which corresponds to the calculated images L and R thereafter produced by the left and right projectors. The system of equations produced is non-linear and non-convertible. Therefore, it can only be solved approximately.

A particularly suitable means for calculating this solution is the iterative method and artificial neural network as described above.

Figure 16:
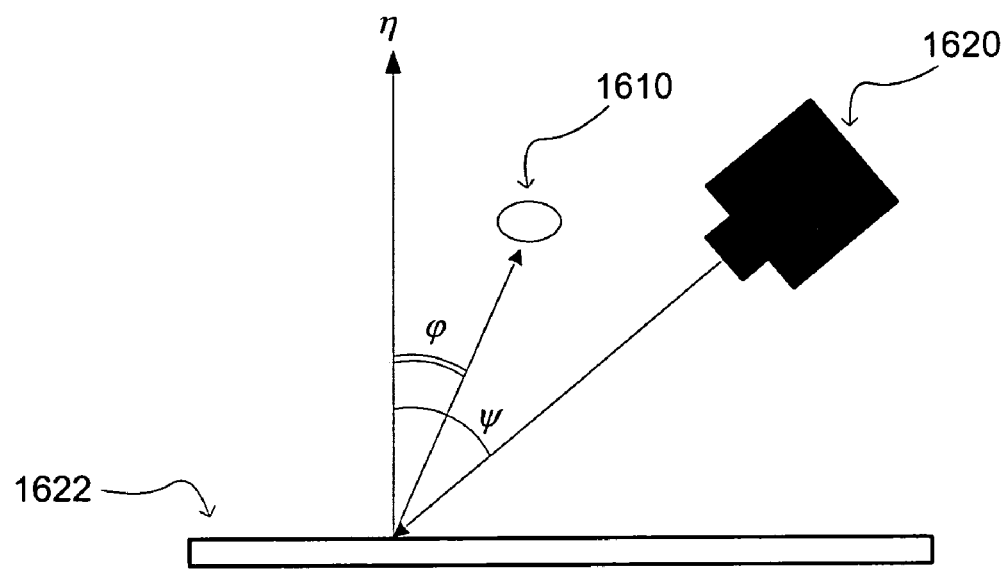
FIG. 16 is a schematic diagram illustrating the imaging geometry of a retro-reflector and image projector.

While FIG. 15 schematically illustrates the geometry of a dynamic stereoscopic image projection system 15' that employs a two projectors to transmit image information to the eye of a viewer via a reflective screen, a single projector can be thought of as being oriented in vertical direction toward the retro-reflective screen at an angle $\psi$. A single projector in this instance will be first discussed separately for sake of clarity and is also depicted by FIG. 16. In this setup, for sake of simplicity, the viewer's eye 1610 is at same horizontal level as projector 1620. In such an arrangement, for each fixed vertical angle, one can determine the following equation for image $I_e$, which image is observed by eye in part of the screen for angles in a defined viewing range $\phi \in [\phi_1, \phi_2]$ from the normal direction:

$$I_e(\phi) = I(\psi) \cdot K(|\phi - \psi|)$$

In the equation above, $I(\psi)$ is a function defining the brightness of the projected light beam that travels from the projector to the retro-reflective screen at an angle $\psi$ from the normal direction $\eta$. The $K(|\phi - \psi|)$, or the function of the kernel, is non-linear and is defined by the reflective features of the screen. An example of a kernel function is the below-listed equation, in which equation immediately above has been modified by substituting the angle defined by $|\phi - \psi|$ for the angle $\alpha$.

$$K(|\varphi - \psi|) = I_0 \cdot \exp\left(-\frac{|\varphi - \psi|^2}{\sigma^2}\right)$$

As indicated above, angles $\phi$ and $\psi$ as are determined from the normal direction $\eta$ relative to the reflector screen.

If the system described is expanded to include a number of projectors in same horizontal level, the equation for the resulting image in a given eye is as follows:

$$I_e(\varphi) = \sum_{i=1}^{n} [I_i(\psi) \cdot K(|\varphi - \psi|)]$$

where n is the number of projectors in the system, and $I(\psi)$ is the brightness of light beam from projector i that approaches the screen 1622 with angle $\psi$ from the normal direction.

To create m different images $I_e(1)$ through $I_e(m)$ for different eyes or eye positions, one needs to solve the following equation system having m equations:

$$I_e(1) = \sum_{i=1}^{n} [I_i(\psi) \cdot K(|\varphi_1 - \psi|)]$$

$$I_e(2) = \sum_{i=1}^{n} [I_i(\psi) \cdot K(|\varphi_2 - \psi|)]$$

...

$$I_e(m) = \sum_{i=1}^{n} [I_i(\psi) \cdot K(|\varphi_m - \psi|)]$$

for n unknown brightness's $I_i(\psi)$ for all projectors. Note that angle $\psi$ does not generally change since the positioning of the projector(s) does not vary significantly. This system may be solved employing a neural network for the light reflecting off the retro-reflector screen similar in manner to how the neural network is used to solve for the light exiting the front LCD screen as described above. Although disclosed in a particular embodiment, one of ordinary skill in the art will readily appreciate how many other equivalent geometries can be employed by the preceding equations accordingly. The appropriate equations are thereafter used to calculate images that are projected by the various projectors in embodiments of the present invention.

Figure 3:
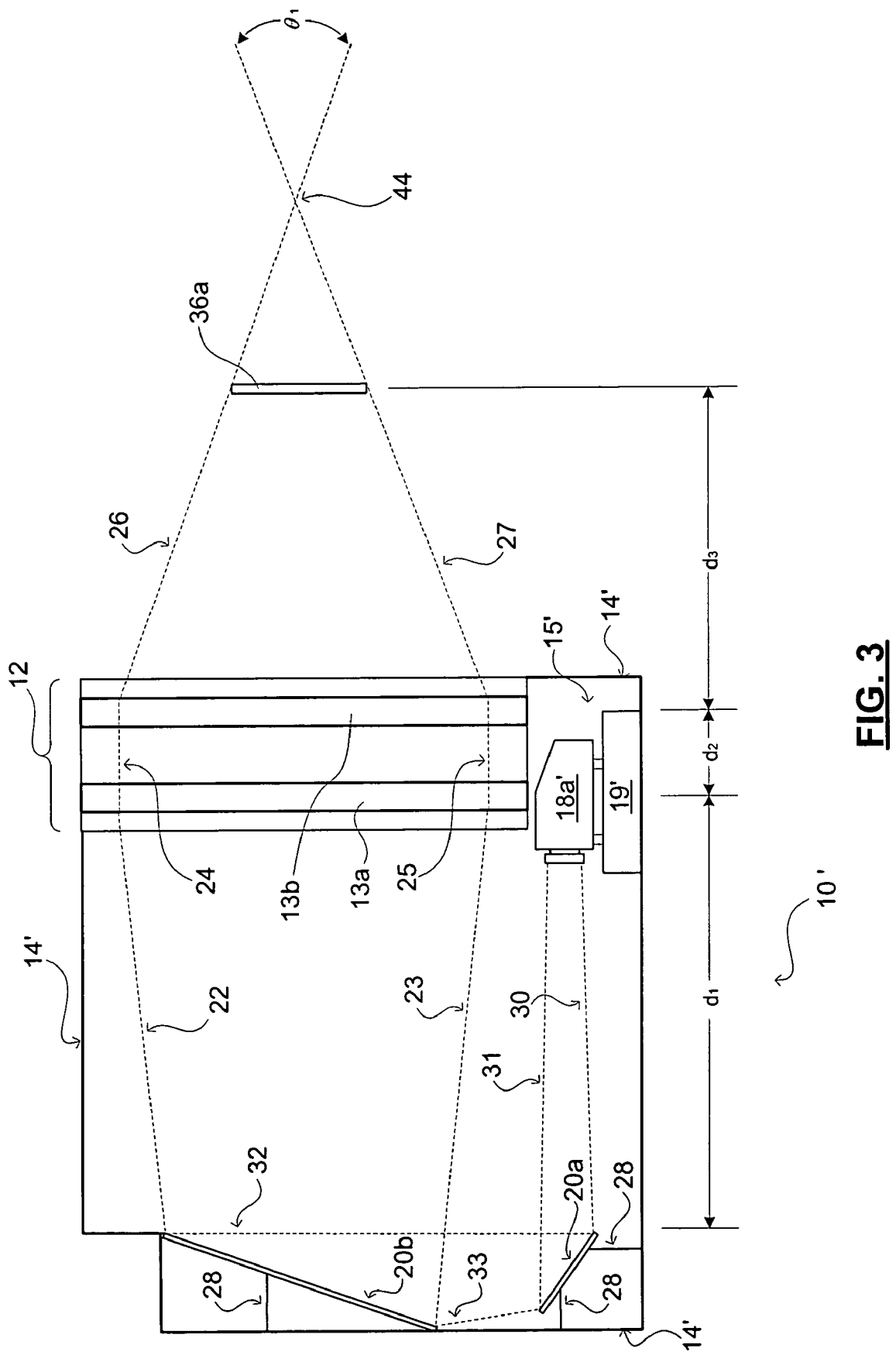
FIG. 3 is a side-view schematic diagram depicting a system for the projection of three-dimensional images according to a second embodiment of the present invention.
Figure 17:
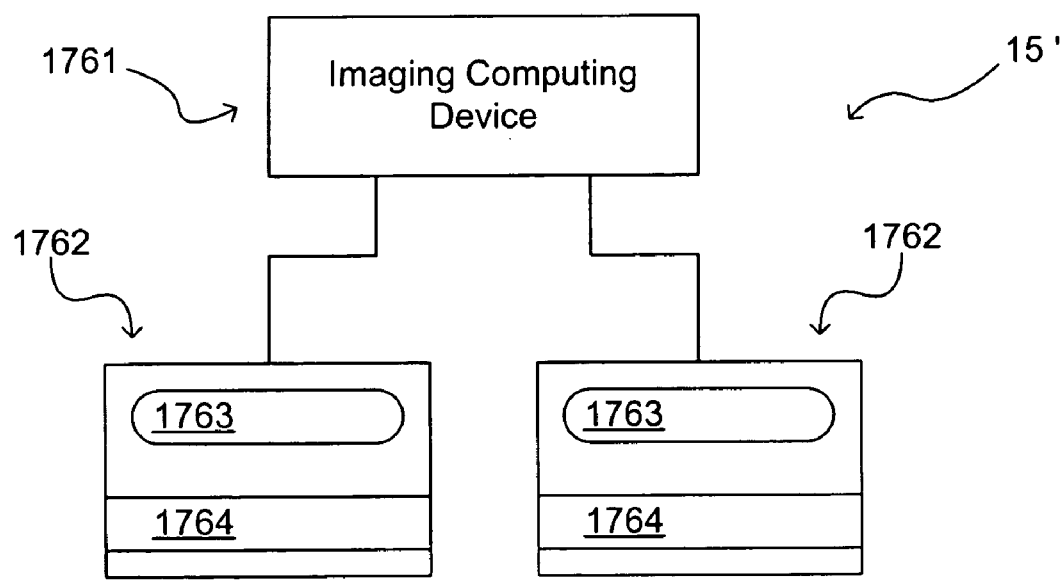
FIG. 17 is a schematic diagram depicting the parts of a dynamic stereoscopic image projection system according to a second embodiment of the present invention.

Referring now to FIG. 17, there is schematically depicted the parts of a dynamic stereoscopic image projection system 15' according to the second embodiment as described above, the parts of which parts may be arranged as depicted in FIG. 3, FIG. 4 and FIG. 15 to project a perceived three-dimensional object to a viewer. As depicted in FIG. 17, an imaging computing device 1761 (which is similar in function and structure to computing device 1001 as described above) is communicatively coupled to and provides control for at least two image projectors 1762 oriented in a known arrangement toward a retro-reflective screen. Each projector can include one or more controllable transmissive panels 1764 (or other suitable electronic display element) for producing images and an illumination source 1663, both of which being controlled by the imaging computational device 1661. In such embodiments, the illumination source 1763 would be adapted to illuminate the transmissive panel 1764 as the panel displays images as provided it by the imaging computational device 1761. The image displayed on any transmissive panel 1764 in any projector 1762 is coordinated by the imaging computational device 1761 with those images displayed and projected by other projectors 1762.

Generally, transmissive panel 1764 is an LCD panel. To provide color control, an LCD multi-panel system may be employed in each projector. Such LCD multi-panel systems typically use three independent LCD panels. It should be further appreciated that transmissive panel 1664 may be other type of electronically controllable device for creating a projected image. For example, instead of the LCD panels, various embodiments of the present invention may employ a suitable spatial light modulator (SLM), such as a digital light processor (DLP) produced by Texas Instruments, Inc. of Dallas, Tex.

As will be readily appreciated by one skilled in the art, in certain embodiments of the invention, the illumination source in each projector can be a substantially broadband white-light source, such as an incandescent lamp, an induction lamp, a fluorescent lamp, or an arc lamp, among others. In other embodiments, the illumination source could be a set of single-color sources with different colors, such as red, green, and blue. These sources may be light emitting diodes ("LEDs"), laser diodes, or other monochromatic and/or coherent sources.

Although disclosed in a particular embodiment, it is clear that many other geometries and embodiments are possible without departing from the scope of the present invention. While preferred embodiments of the present invention have been shown and described herein, it will be obvious to those skilled in the art such embodiments are provided by way of example only. Numerous insubstantial variations, changes, and substitutions will now be apparent to those skilled in the art without departing from the scope of the invention disclosed herein by the Applicants. Accordingly, it is intended that the invention be limited only by the spirit and scope by the claims as follows.

What is claimed is:

1. A method for imaging a free space three dimensional perceived image, said method comprising:
    obtaining a retro-reflective screen, said screen having a known non-linear light reflection pattern;
    obtaining an optic module comprising a doublet of Fresnel lenses;
    aligning at least two image projectors in a geometry so as to be able to project images off said screen and through said optic module;
    simultaneously calculating separate two-dimensional images for projecting by each projector, said calculated images being derived from stereopair image information regarding the object and from said pattern and said geometry; and
    projecting said calculated images from said projectors onto said screen such that they reflect off said screen and through said optic module to produces a three-dimensional image of said object to a viewer at a known location.

2. The method according to claim 1, wherein Fresnel lens are oriented in opposite directions relative to an optic path.

3. The method according to claim 2, wherein said Fresnel lenses are oriented with echelon grooves facing inward toward each other, and said echelon grooves are in positive relief.

4. The method according to claim 1, wherein said projectors include tramsmissive liquid crystal display panels for displaying said calculated images.

5. The method according to claim 1, wherein said calculated images are iteratively calculated to reduce error in said three-dimensional image of said object.

6. The method according to claim 5, wherein said iterative calculations of said calculated images is performed by a computational device employing a neural network.

7. The method according to claim 1, wherein said calculated images are obtained by the steps of:
    estimating the light wave components being created by individual pixels of a display in each projector when displaying each said calculated image;
    calculating a resulting three dimensional image of an object from the expected interaction of said estimated light wave components and said known pattern;
    comparing the resulting three dimensional image with a desired three dimensional image to obtain a degree of error; and
    adjusting said flat image until said error reaches a predetermined threshold.

8. The method according to claim 7, wherein said steps for calculating said amplitude information is performed using a neural network.

9. The method according to claim 1, further comprising sensing the location of said viewer.

10. The method according to claim 1, wherein said step of simultaneously calculating separate two-dimensional images for projecting by each projector comprising solving a system of non-linear equations.

11. The method according to claim 1, wherein said calculated images are derived from base stereoscopic images in memory, and wherein said calculated images are derived so as to act as masks for one another once projected to produce stereoscopic viewable images.

12. A system for producing a perceived three-dimensional image of an object, said system comprising:
    an optic module comprising a doublet of Fresnel lenses;
    a dynamic stereoscopic image projection system containing at least two image creation units being aligned in a geometry relative to optic module, and said image creation units each containing electronically switchable displays for producing two-dimensional images;
    an imaging computational device containing a processor, said device being adapted to control pixels of said switchable displays, and said device being adapted to derive a separate flat images for each display, said flat images being calculated by said device using said pattern and said geometry and electronic stereopair images of the object to create a stereoscopic image when said derived flat images are projected through said optic module.

13. The system according to claim 12, wherein said units are stacked transmissive liquid crystal display panels placed in front of an illumination source.

14. The system according to claim 12, wherein said units comprise electronically controllable image projectors, and said system further comprising a retro-reflective screen upon which said projectors project said derived flat images for reflection through said optic module.

15. The system according to claim 12, wherein said flat images are iteratively calculated in said computational device to reduce error in said three dimensional image of said object.

16. The system according to claim 15, wherein said computational device employs a neural network to reduce error in said three dimensional image of said object.

17. The system according to claim 12, wherein said computational device calculates said flat images by operating according to the steps of:
    estimating the light wave components being created by individual pixels of said displays when displaying each said flat image;

calculating a resulting three dimensional image of an object from the expected interaction of said estimated light wave components of said flat images when simultaneously projected;

comparing the resulting three dimensional image with a desired three dimensional image to obtain a degree of error; and adjusting said flat image until said error reaches a predetermined threshold.

18. The system according to claim 17, wherein said steps for calculating said amplitude information is performed using a neural network.

19. The system according to claim 12, wherein said display control system further comprises means for sensing a spatial orientation of a viewer of said three dimensional image, and wherein said computational device is adapted to adjust said generated flat images such that said viewer can perceive said three dimensional image of the object.

20. The system according to claim 12, wherein said computational device simultaneously calculates said flat images for projecting by each projector by solving a system of non-linear equations.

21. The system according to claim 12, wherein said Fresnel lens are oriented in opposite directions relative to an optic path.

22. The system according to claim 21, wherein said Fresnel lenses are oriented with echelon grooves facing inward toward each other, and said echelon grooves are in positive relief.

23. The system according to claim 12, wherein said system is enclosed in a cabinet to prevent ambient light from passing through said optic module.

* * * * *